United States Patent
Tan et al.

(10) Patent No.: US 12,056,133 B2
(45) Date of Patent: Aug. 6, 2024

(54) FAST NEURAL RANKING ON BIPARTITE GRAPH INDICES

(71) Applicant: Baidu USA, LLC, Sunnyvale, CA (US)

(72) Inventors: Shulong Tan, Mountain View, CA (US); Weijie Zhao, Sunnyvale, CA (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 0 days.

(21) Appl. No.: 17/555,316

(22) Filed: Dec. 17, 2021

(65) Prior Publication Data

US 2023/0195733 A1    Jun. 22, 2023

(51) Int. Cl.
*G06F 16/2457*    (2019.01)
*G06F 16/901*    (2019.01)

(52) U.S. Cl.
CPC .... *G06F 16/24578* (2019.01); *G06F 16/9024* (2019.01)

(58) Field of Classification Search
CPC .............. G06F 16/24578; G06F 16/9024
See application file for complete search history.

(56) References Cited

U.S. PATENT DOCUMENTS

| | | | | |
|---|---|---|---|---|
| 2011/0173189 A1* | 7/2011 | Singh | .................. | G06F 16/9024 707/722 |
| 2015/0220530 A1* | 8/2015 | Banadaki | ................ | G06F 16/90 707/723 |
| 2019/0333256 A1* | 10/2019 | Xu | ........................ | G06F 16/904 |
| 2019/0362220 A1* | 11/2019 | Yap | ........................ | G06N 3/045 |
| 2021/0157606 A1* | 5/2021 | Zhao | .................... | G06F 18/2323 |
| 2021/0357869 A1* | 11/2021 | Wadhwa | ............ | G06Q 10/1053 |

OTHER PUBLICATIONS

Zhou et al., "Möbius Transformation for Fast Inner Product Search on Graph," In Advances in Neural Information Processing Systems (NeurIPS), 2019. (12pgs).

L. Cayton, "Fast nearest neighbor retrieval for bregman divergences," In Proceedings of the 25th International Conference on Machine learning (ICML), 2008. (8pgs).

Chang et al., "Pre-training Tasks for Embedding-based Large-scale Retrieval," In Proceedings of the 8th International Conference on Learning Representations (ICLR), 2020.(12pgs).

M. S. Charikar, "Similarity estimation techniques from rounding algorithms," In Proceedings on 34th Annual ACM Symposium on Theory of Computing (STOC), 2002. (9pgs).

Chen et al., "Reading Wikipedia to Answer Open-Domain Questions, "In Proceedings of the 55th Annual Meeting of the Association for Computational Linguistics (ACL), 2017.(10 pgs).

(Continued)

*Primary Examiner* — Miranda Le
(74) *Attorney, Agent, or Firm* — NORTH WEBER & BAUGH LLP

(57) ABSTRACT

Presented are systems and methods that construct BipartitE Graph INdices (BEGIN) embodiments for fast neural ranking. BEGIN embodiments comprise two types of nodes: sampled queries and base or searching objects. In one or more embodiments, edges connecting these nodes are constructed by using a neural network ranking measure. These embodiments extend traditional search-on-graph methods and lend themselves to fast neural ranking. Experimental results demonstrate the effectiveness and efficiency of such embodiments.

18 Claims, 17 Drawing Sheets

(56) References Cited

OTHER PUBLICATIONS

Covington et al., "Deep Neural Networks for YouTube Recommendations," In Proceedings of the 10th ACM Conference on Recommender Systems (RecSys), 2016. (8pgs).
Curtin et al., "Dual-Tree Fast Exact Max-Kernel Search," Statistical Analysis & Data Mining: The ASA Data Science Journal 7, 4 (2014), 229-253, 2014. (25pgs).
Curtin et al., "Fast Exact Max-kernel Search," In Proceedings of the 13th SIAM International Conference on Data Mining (SDM),2013. (9pgs).
Dehghani et al., "Neural Ranking Models with Weak Supervision," In Proceedings of the: 40th International ACM SIGIR Conference on Research and Development in Information Retrieval (SIGIR), 2017. (10 pgs).
Devlin et al., "BERT: Pre-training of Deep Bidirectional Transformers for Language Understanding," arXiv preprint arXiv:1810.04805, 2019. (16 pgs).
He et al., "Neural collaborative filtering," arXiv preprint arXiv:1708.05031, 2017. (10 pgs).
Hinton et al., "Distilling the knowledge in a neural network," arXiv preprint arXiv:1503.02531, 2015. (9 pgs).
Indyk et al., "Approximate Nearest Neighbors: Towards Removing the Curse of Dimensionality," In Proceedings of the 30th Annual ACM Symposium on the Theory of Computing (STOC), 604-613,1998.(10pgs).
S. Ioffe, "Improved Consistent Sampling, Weighted Minhash and L1 Sketching," In Proceedings of the 10th IEEE International Conference on Data Mining (ICDM), 2010. (10 pgs).
M. Iwasaki, "Pruned Bi-directed K-nearest Neighbor Graph for Proximity Search," [online], [Retrieved Mar. 9, 2023]. Retrieved from Internet <URL: https://link.springer.com/chapter/10.1007/978-3-319-46759-7_2#chapter-info> [Abstract Only] (2 pgs).
Iwasaki et al., "Optimization of indexing based on k-nearest neighbor graph for proximity search in high-dimensional data," arXiv preprint arXiv:1810.07355, 2018. (12pgs).
Jégou et al., "Hamming Embedding and Weak Geometric Consistency for Large Scale Image Search," In Proceedings of the 10th European Conf. on Computer Vision (ECCV), 2008.(15pgs).
Jégou et al., "Product quantization for nearest neighbor search," IEEE Trans. Pattern Anal. Mach. Intell. 33, 1 (2011), 117-128, 2011. (14pgs).
In Proceedings of the 27th ACM SIGKDD Conference on Knowledge Discovery & Data Mining (KDD), 2021. (9pgs).
Tan et al., "Fast item ranking under neural network based measures," In Proceedings of the 13th International Conference on Web Search and Data Mining (WSDM), 2020. (9pgs).
Tang et al., "Ranking Distillation: Learning Compact Ranking Models With High Performance for Recommender System," arXiv preprint arXiv:1809.07428, 2018. (10pgs).
Tay et al., "Latent Relational Metric Learning via Memory-based Attention for Collaborative Ranking," arXiv preprint arXiv:1707.05176, 2018. (11pgs).
Wu et al., "Multiscale Quantization for Fast Similarity Search," In Advances in Neural Information Processing Systems (NIPS), 2017. (11pgs).
Wu et al., "Fast and unified local search for random walk based k-nearest-neighbor query in large graphs," In Proceedings of the International Conference on Management of Data (SIGMOD), 2014. (12pgs).
Xiong et al., "End-to-end neural ad-hoc ranking with kernel pooling," arXiv preprint arXiv:1706.06613, 2017. (10pgs).
Zhang et al., "Deep Mutual Learning," In Proceedings of the 2018 IEEE Conference on Computer Vision and Pattern Recognition (CVPR), 2018. (9pgs).
Zhao et al., "SONG: Approximate Nearest Neighbor Search on GPU," In Proceedings of the 36th IEEE International Conference on Data Engineering (ICDE), 2020. (12 pgs).
Jiang et al., "Clustering and Constructing User Coresets to Accelerate Large-scale Top-K Recommender Systems," In Proceedings of the Web Conference (WWW), 2177-2187, 2020. (11p).
Johnson et al., "Billion-Scale Similarity Search with GPUs, "IarXiv preprint arXiv:1702.08734, 2017. (12pgs).
P. Li, "Linearized GMM Kernels and Normalized Random Fourier Features," In Proceedings of the 23rd ACM SIGKDD International Conference on Knowledge Discovery & Data Mining (KDD), 2017. (10pgs).
Li et al., "Consistent Sampling Through Extremal Process," In Proceedings of the Web Conference (WWW), 2021. (11pgs).
Li et al., "Coding for Random Projections," In Proceedings of the 31th International Conference on Machine Learning (ICML), 2014. (9 pgs).
Li et al., "One-Sketch-for-All: Non-linear Random Features from Compressed Linear Measurements," In Proceedings of the 24th International Conference on Artificial Intelligence and Statistics (AISTATS), 2021. (11pgs).
Lu et al., "A Deep Architecture for Matching Short Texts," In Advances in Neural Information Processing Systems (NIPS), 2013. (9pgs).
Malkov et al., "Efficient and Robust Approximate Nearest Neighbor Search Using Hierarchical Navigable SmallWorld Graphs," IEEE Trans. Pattern Anal., 2020. (13pgs).
Fu et al., "Fast approximate nearest neighbor search with the navigating spreading-out graph," Proceedings of the VLDB Endowment 12, 5 (2019), 461-474, 2019. (14pgs).
Ge et al., "Optimized Product Quantization for Approximate Nearest Neighbor Search," In Proceedings of the:. 2013 IEEE Conference on Computer Vision & Pattern Recognition (CVPR), 2946-2953, 2013. (8 pgs).
Gionis et al., "Similarity Search in High Dimensions via Hashing," In Proceedings of 25th International Conference on Very Large Data Bases (VLDB), 518-529, 1999. (12pgs).
Goemans et al., "Improved Approximation Algorithms for Maximum Cut and Satisfiability Problems Using Semidefinite Programming," J. ACM 42, 6 (1995), 1115-1145, 1995. (31pgs).
Guo et al., "DeepFM: A Factorization-Machine based Neural Network for CTR Prediction," arXiv preprint arXiv:1703.04247, 2017. (8pgs).
Guo et al., "A Deep Relevance Matching Model for Ad-hoc Retrieval," In Proceedings of the 25th ACM Intr. Conf. on Information & Knowledge Management (CIKM), 2016. (10pgs).
Guo et al., "A Deep Look into neural ranking models for information retrieval," arXiv preprint arXiv:1903.06902, 2019. (61pgs).
Hajebi et al., "Fast Approximate Nearest-Neighbor Search with κ-Nearest Neighbor Graph," In Proceedings of the 22nd International Joint Conference on Artificial Intelligence (IJCAI), 1312-1317, 2011.(6pgs).
Manasse et al., "Consistent Weighted Sampling," Technical Report MSR-TR-2010-73, Microsoft Research, 2010. (12 pgs).
Mitra et al., "An introduction to neural information retrieval," Foundations and Trends® in Information Retrieval, 2018. (119 pgs).
Morozov et al., "Non-metric Similarity Graphs for Maximum Inner Product Search," In Advances in Neural Information Processing Systems (NeurIPS), 2018.(10pgs).
Rahimi et al., "Random Features for Large-Scale Kernel Machines," In Advances in Neural Information Processing Systems (NIPS), 2007. (8pgs).
Rajaraman et al., "Mining of Massive Datasets," Cambridge University Press, 2011. (513 pgs).
Severyn et al., "Learning to Rank Short Text Pairs with Convolutional Deep Neural Networks," In Proceedings of the 38th International ACM SIGIR Conference on Research & Development in Information Retrieval (SIGIR), 2015. (10 pgs).
Shrivastava et al., "Fast Near Neighbor Search in High-Dimensional Binary Data," In Proceedings of European Conference on Machine Learning & Knowledge Discovery in Databases (ECML-PKDD), 2012. (16pgs).

* cited by examiner

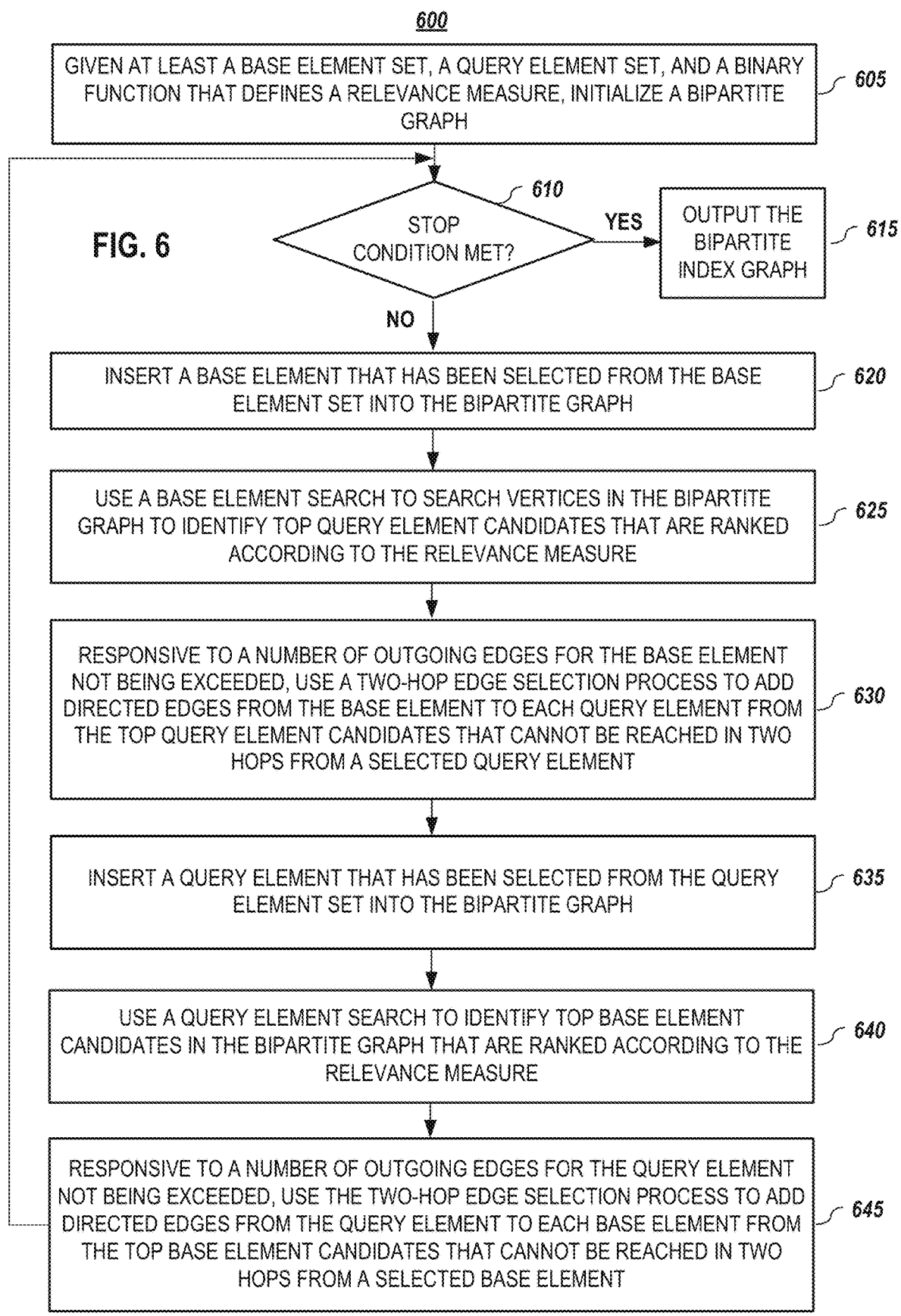

700

```
┌─────────────────────────────────────────────────┐
│ GIVEN AT LEAST A QUERY ELEMENT, A BIPARTITE     │
│ GRAPH, AND A BINARY FUNCTION, WHICH GIVEN A     │
│ BASE ELEMENT AND THE QUERY ELEMENT PROVIDES     │─ 705
│ A RELEVANCE MEASURE, RANDOMLY SELECT, FROM A    │
│ SET OF BASE VERTICES, A BASE VERTEX ON THE      │
│ BIPARTITE GRAPH AS A STARTING POINT             │
└─────────────────────────────────────────────────┘
                         │
                         ▼
┌─────────────────────────────────────────────────┐
│ USE THE BASE VERTEX TO INITIALIZE A PRIORITY    │
│ QUEUE WITH A PAIRED ENTRY COMPRISING: (1) THE   │
│ RELEVANCE MEASURE OBTAINED USING THE BASE       │─ 710
│ VERTEX AND THE QUERY ELEMENT AS INPUTS TO THE   │
│ BINARY FUNCTION AND (2) THE BASE VERTEX OR AN   │
│ IDENTIFIER OF THE BASE VERTEX                   │
└─────────────────────────────────────────────────┘
                         │
                         ▼
┌─────────────────────────────────────────────────┐
│ CONSIDER THE BASE VERTEX AS CHECKED, AND        │
│ CONSIDERING THE REMAINDER OF THE SET OF BASE    │─ 715
│ VERTICES AS UNCHECKED                           │
└─────────────────────────────────────────────────┘
                         │
                         ▼
                    ╱ 720
              NO   ╱       ╲
         A ◄─────╱   STOP    ╲
                 ╲ CONDITION  ╱
                  ╲  MET?   ╱
                   ╲       ╱
                    ╲     ╱
                      │ YES
                      ▼
┌─────────────────────────────────────────────────┐
│ CONSIDER THE BASE VERTEX AS CHECKED, AND        │
│ CONSIDERING THE REMAINDER OF THE SET OF BASE    │─ 725
│ VERTICES AS UNCHECKED                           │
└─────────────────────────────────────────────────┘
```

FAST NEURAL RANKING ON BIPARTITE GRAPH INDICES

BACKGROUND

A. Technical Field

The present disclosure relates generally to systems and methods for computer learning that can provide improved computer performance, features, and uses. More particularly, the present disclosure relates to fast neural ranking search-on-graph systems and methods.

B. Background

Neural network-based ranking is widely adopted due to its powerful capacity in modeling complex relationships such as between users and items or questions and answers. Online neural network ranking, i.e., so-called "fast neural ranking," is considered challenging because neural network measures are in general non-convex and asymmetric. Traditional Approximate Nearest Neighbor (ANN) search, which usually focuses on metric ranking measures, is not applicable to these complex measures. Accordingly, what is needed are search-on-graph methods systems and methods that are suitable for fast neural ranking.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 6 is a flowchart of an illustrative process for generating a bipartite graph to determine relevant results given an input query, according to embodiments of the present disclosure.

FIGS. 7A and 7B is a flowchart of an illustrative process for searching on a bipartite graph to determine relevant results given an input query, according to embodiments of the present disclosure.

DETAILED DESCRIPTION OF EMBODIMENTS

Figure 1:
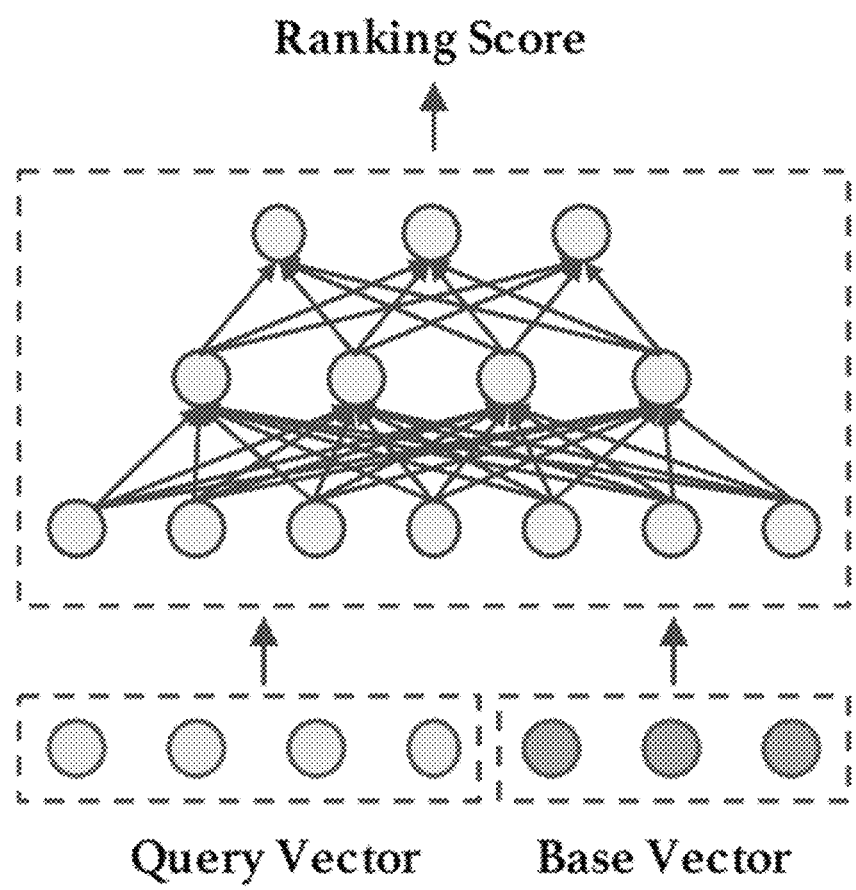
FIG. 1 depicts a simplified example of neural network ranking measures.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists of items that follow are example items and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to a system component or components into which information may be entered or otherwise recorded. A set may contain any number of elements, including the empty set.

Any headings used herein are for organizational purposes only and shall not be used to limit the scope of the description or the claims. Each reference/document mentioned in this patent document is incorporated by reference herein in its entirety.

It shall be noted that any experiments and results provided herein are provided by way of illustration and were performed under specific conditions using a specific embodiment or embodiments; accordingly, neither these experiments nor their results shall be used to limit the scope of the disclosure of the current patent document. It is further noted that the terms "ranking function," "similarity measure," "relevance measure," and "ranking measure" are used interchangeably herein.

In recent years, neural network-based ranking models have played an increasingly vital role in information retrieval, recommendation, and question answering. For a typical neural network ranking measure, given a query and a base or searching object, a neural network type measure returns a ranking score.

FIG. 1 depicts a simplified example of a common neural network ranking measure that receives a query vector and a base vector as inputs to a neural network. The input vectors, which are obtained, e.g., by using an embedding process that involves any number of embedding layers, may be concatenated to generate and output ranking scores. Neural networks are flexible in modeling complex relationships among different kinds of objects, such as queries and documents, users and items, or questions and answers. However, neural networks are very time-consuming when deployed in online ranking applications. Therefore, neural network-based ranking models are typically used in offline ranking or re-ranking on pre-produced subsets that are relatively small. Directly deploying neural network-based measures for online ranking services on large base sets typically requires very efficient searching indices, such as ANN search methods. Traditional ANN search methods are designed mainly for simple ranking measures, such as $\ell_2$-distance, cosine similarity, inner product, generalized min-max (GMM), etc. Extending ANN search methods for fast neural ranking scenarios is often not straightforward. Fast and approximate ranking by neural network measures (fast neural ranking) remains challenging as such ranking measures tend to be complex, non-convex, and asymmetric.

One existing approach extends the definition of traditional ANN search to a generic setting, OBFS, as follows: Let X and Y be subsets of Euclidean spaces, given a data set $S=\{x_1, \ldots, x_n\} \subset X$ and a continuous binary function, $f: X \times Y \rightarrow \mathbb{R}$, given $q \in Y$, OBFS aims to find: $\mathrm{argmax}_{x_i \in S} f(x_i, q)$. In this definition, ranking measures are considered binary functions. There are no strong assumptions for the search function, whether metric or non-metric, linear or non-linear, convex or non-convex, symmetric or asymmetric. This approach further provides a solution for fast OBFS, called SL2G, and extends traditional graph-based fast vector searching methods by constructing graph indices in $\ell_2$-distance, but searching is performed according to the focused binary function. Although SL2G works well for some binary functions, approximating relationships among base data (e.g., item vectors) by $\ell_2$-distance is problematic. As defined in OBFS, there exists a ranking measure definition only between base vectors (from X) and queries (from Y). In other words, there is usually no definition for distances between base vectors (i.e., $(x_i, x_j)$) or distances between query vectors (i.e., $(q_i, q_j)$). Accordingly, it is not proper to model relationships among base data by $\ell_2$-distance.

Figure 2A:
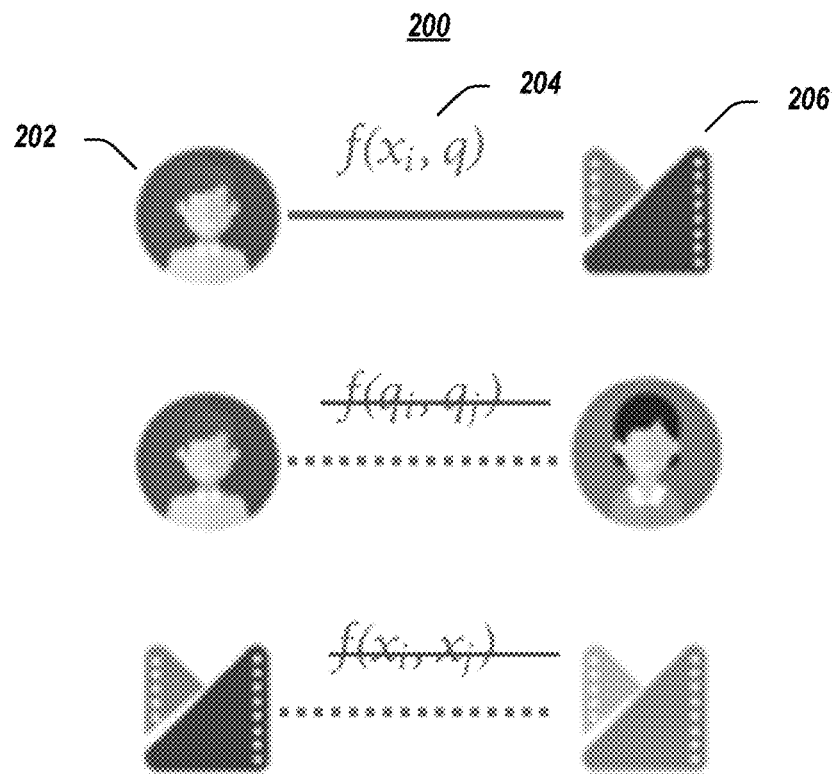
FIG. 2A and FIG. 2B depict challenges associated with existing Optimal Binary Function Search (OBFS) and Search on L2 Graph (SL2G) methods, respectively.
Figure 2B:
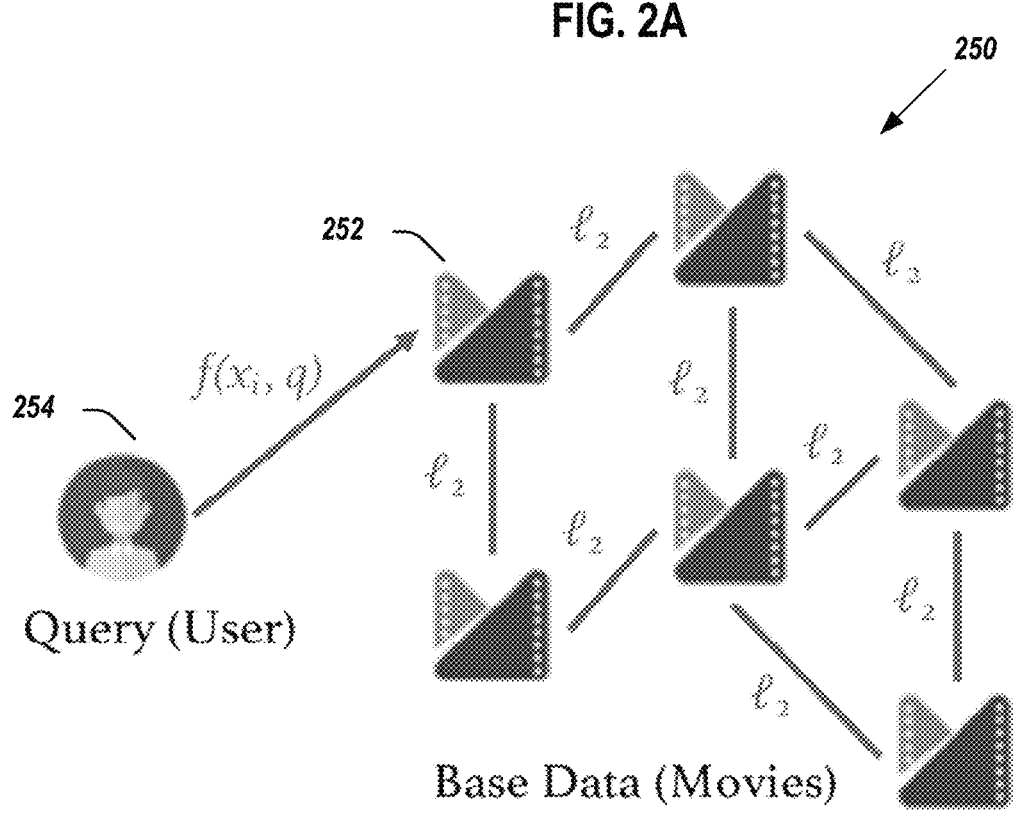

FIG. 2A and FIG. 2B depict the challenges associated with existing OBFS and SL2G methods. Given exemplary collections of users q (e.g., 202) and movies $x_i$ (e.g., 206), and binary function $f(x_i, q)$ (e.g., 204) learned on historical user-movie preference pairs, binary function 204 predicts the ranking score of pairs, i.e., how much a given user likes a movie. FIG. 2A illustrates challenges in adapting ANN algorithms to the fast OBFS problem. Binary function 204 is defined on movie-user pairs, and no user-user or movie-movie distance/similarity is defined. However, traditional ANN methods, e.g., a proximity graph, require the distance between base data vectors to construct an index.

As shown in FIG. 2B, SL2G exploits $\ell_2$-graph 250 to approximate the binary function search space. As discussed in Section C.2 below, experimental results herein utilize a designed baseline, Sample-Ave, which estimates base data distances using the average of $f$ value difference within a query sample set. This baseline statistically estimates the relationships of base vectors; however, its performance is similar to that of SL2G and far from optimal. This further illustrates that estimated base data distances (i.e., $(x_i, x_j)$) are not well-suited to solve the OBFS problem.

Figure 3:
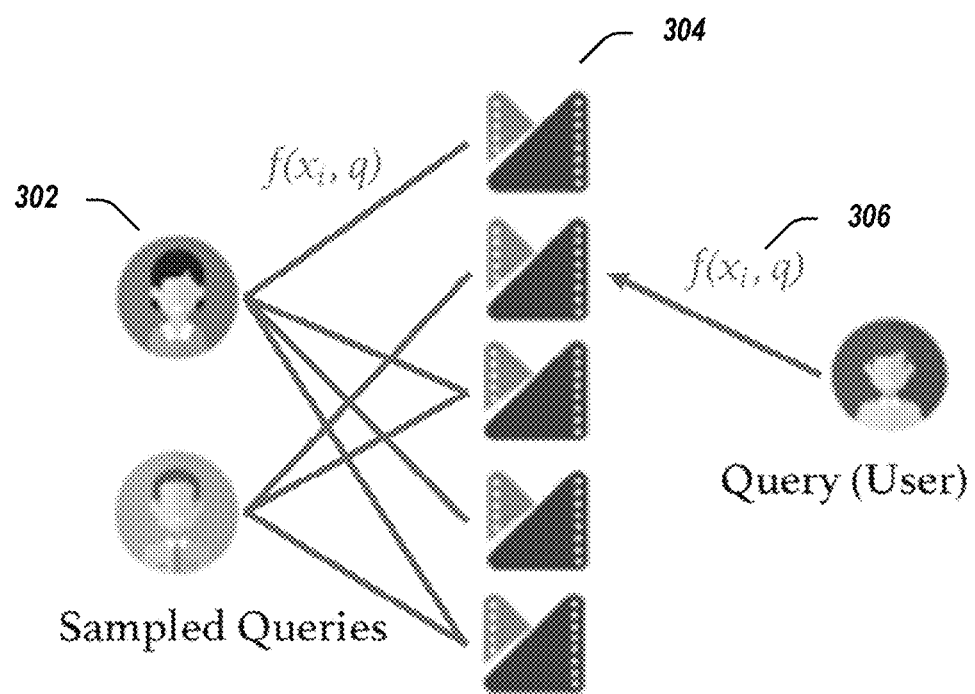
FIG. 3 represents embodiments that employ BipartitE Graph INdices (BEGIN) to solve fast OBFS, according to embodiments of the present disclosure.

FIG. 3 represents embodiments that employ BEGIN to solve fast OBFS, according to embodiments of the present disclosure. One or more BEGIN embodiments build a bipartite graph that leverages users to bridge relations among movies. This enables applying graph-based search methods on fast OBFS without having to know distances between users $f(q_i, q_j)$ or relationships between movies $f(x_i, x_j)$. In particular, one or more embodiments utilize two types of nodes in a bipartite graph that are defined by sampled queries 302 (e.g., q) and base data 304 (e.g., x). Edges that connect the two types of nodes may be constructed based on a ranking measure 306 (e.g., $f(x, q)$). Intuitively, ranking tasks, such as recommendation, lend themselves to a bipartite graph representation. In FIG. 3, the two types of nodes correspond to users and items, and edges may be constructed based on interactions between users and items. Unlike SL2G applications, graph construction does not require an estimate of distances between base vectors or queries. Unlike traditional graph indices such as Hierarchical Navigable Small World Malkov (HNSW) and Navigating Spreading-out Graph (NSG), which contain uni-type nodes and are designed for ranking according to metric measures, BEGIN is an extension of previous methods but for ranking by generic binary functions. As discussed in greater detail below, various embodiments herein enhance performance on the trade-off between searching efficiency and effectiveness by utilizing a two-hop edge selection criterion and a fast search method. Experimental data evaluate BEGIN on both synthetic and learned neural network measures. The presented embodiments comprise the following contributions:

(1) BEGIN—a novel graph indexing and searching methodology—bridges the gap between generic binary function search and common metric ranking on graph-based indices;

(2) a two-hop edge selection criterion ensures that a restricted number of edges in BEGIN is chosen effectively;

(3) a fast searching process heuristically prunes "bad" candidates to optimize the query execution on the bipartite graph index;

(4) four methods are investigated to generate query samples when the known queries are not enough; and (5) BEGIN is experimentally evaluated on two synthetic measures and three recommendation neural networks over three common recommendation datasets. Experiments demonstrate that BEGIN outperforms SL2G in most cases under various evaluation measures.

A. General Background Information and Related Work

1. Fast Top-K Search

This section connects the generic ranking problem (OBFS) with traditional ANN search and introduces some applications of OBFS. At the methodology level, it is explained why previous fast search algorithms designed for ANN search are not applicable to the generic OBFS problem.

Fast top-K search has wide applications in modern information systems, such as in top-K recommender systems for e-commerce and link prediction for social networks. For online services, search efficiency is as important as search effectiveness. Fast search algorithms try to construct some type of index structure beforehand such as to speed up the online searching process. Traditional fast search problems restrict searching measures to metric measures, such as cosine similarity or $\ell_2$ distance, or simple non-metric measures, such as inner product, that are widely exploited in recommender systems. Fast search via metric measures is usually referred to as ANN search.

OBFS is a generic definition for fast top-K search. Theoretically, an OBFS task may choose any binary function as a search measure, e.g., linear or non-linear, metric or non-metric, convex or non-convex, symmetric and asymmetric. Traditional ANN search is a special instance of OBFS. Neural network-based ranking measures are also examples of searching binary functions. Setting a user vector and an item vector as inputs, one can design any neural network structures as ranking measures. Parameters of the network may be learned on training data without being fixed beforehand. These kinds of neural network-based searching functions are usually non-convex, which are not studied by traditional ANN search work. There exist several real cases of neural networks-based searching measures, such as Multi-Layer Perceptron (MLP) and Bidirectional Encoder Representations from Transformers (BERT)-style ones, which have wide applications in recommendation, ads ranking, and retrieve-based question answering. This patent document focuses mainly on the generic fast OBFS problem, especially, on how to improve searching process speed under neural network-based measures (fast neural ranking).

2. Existing Fast Search Methods

There exist many methods for fast neighbor search, such as hashing-based methods, quantization-based methods, graph-based indices, and tree-based methods. For each of these methods, each given query is compared with a subset of a dataset, and not the entire dataset, or compared by shorter codes, which significantly reduces the time complexity, while aiming at retaining high search recalls.

Most such methods are designed for traditional ANN search. For example, a particular Locality-Sensitive Hashing (LSH) algorithm is usually designed for a specific measure, such as "Gaussian random projections" for cosine similarity, or "random Fourier features" for radial basis function kernel similarity, and "consistent weighted sampling" for min-max kernel similarity, etc. One major drawback these methods have in common is that they cannot be extended to neural network-based measures. Search-on-graph methods often claim that there are no constraints on searching measures (when, in fact, they must be symmetric), most existing search-on-graph methods, however, mainly focus on searching by metric distances. Although graph-based indices for traditional ANN search have shown superiority in the trade-off between search efficiency and effectiveness, their performance suffers dramatically when applied to generic ranking problems. This is mainly because such methods require the definition between base data to construct a proximity graph, which are not well-defined under the setting of fast neural ranking.

One approach (CANTOR) utilizes user coresets (e.g., centroids of clusters) to improve the performance of traditional ANN search. User coresets are used as "short-cuts" in CANTOR: results for users/queries in coresets are recorded and returned directly as results for queries similar to them. Various embodiments herein exploit query samples differently from the user corsets in CANTOR, e.g., by using query samples as "bridges" to connect base data. CANTOR works well on ANN search, based on the assumption that similar queries (in metric spaces) will have similar retrieval results. Yet, this assumption may not hold for neural ranking problems as distances between queries are not well-defined.

3. Why not SL2G?

As analyzed above, most existing fast vector ranking approaches focus on simple ranking measures, mainly metric measures and inner product, which cannot be easily extended to generic ranking measures. One exception is SL2G, which is designed for the generic fast OBFS problem. The basic idea behind SL2G is that (1) irrespective of a given binary function $f$, in the indexing step, a Delaunay graph or approximate Delaunay graph is constructed with respect to $\ell_2$ distance, which is defined on searching/base data X and is independent of queries, then (2), in the searching step, SL2G performs a greedy search on the graph by the binary function $f$.

The theoretical basis of SL2G is that the performance of a greedy search on an $\ell_2$ graph is similar to optimizing OBFS by "coordinate" descent in Euclidean space. If the binary function $f$ is smooth and the data are sufficiently dense, SL2G will reach an approximate local optimum. The fast ranking problem involves a trade-off between effectiveness and efficiency. The theoretical analysis of SL2G guarantees effectiveness but not efficiency. In addition, SL2G utilizes $\ell_2$ distance to approximate relationships among base data, which are undefined, as shown in FIG. 2A and FIG. 2B. While neural network models learn the relevance/distance function between queries and base data, relationships between two base data points cannot be determined. Assuming base data points 252 in FIG. 2B are movies in a recommendation system and queries 254 are individual users, some users may think that two movies are closely related because they are directed by the same director, while other users may not agree, e.g., because they are in two different categories. Therefore, constructing graph indices based on estimated base data distances is problematic.

Various embodiments herein extend graph-based indices to bipartite graph indices to solve generic OBFS problems, e.g., by utilizing two types of vertices—base data and sample queries. In one or more embodiments, fast ranking methods allow any generic searching measure to be applied for online ranking services, e.g., neural network-based measures. As a result, more advanced semantic information may be captured in the ranking/searching procedure and user experience may, thus, be greatly improved. Alternative embodiments accommodate complicated ranking measures on large data, e.g., by taking advantage of one or more graphics processing units (GPUs) to further accelerate computations and/or by compressing neural network-based measures using knowledge distillation techniques.

B. Bipartite Graph Indices Embodiments

1. Index Construction Embodiments

Unlike SL2G methods, various embodiments construct a graph index based on a ranking binary function without having to estimate distances between base data. As illustrated in FIG. 3, a graph index may be built as a bipartite graph (BEGIN). In one or more embodiments, in addition to base data points, a set of query samples may be used as a second types of nodes. Nodes may be connected by edges in the graph. In an exemplary recommendation system, each item (e.g., base data) may connect to users (e.g., queries), who rate that item, e.g., by a relatively high score; and each user may connect to their favorite items.

Method 1 below represents an exemplary BEGIN construction that, in embodiments, may be iteratively constructed. The graph may be initialized as an empty graph, and, in embodiments, nodes of base data and queries may be alternately inserted. Since the first node will not find any neighbors, it is inserted as an isolated node. Subsequent nodes will find at least one neighbor when using the search process. In one or more embodiments, as shown in exemplary Methods 2 and 3, two greedy search methods, one for base data search and one for query search, may be used. In one or more embodiments, for the base search, a candidate set of queries may be returned, while for the query search, a candidate set of base nodes may be returned. Most steps in Methods 2 and 3 are the same, except for the starting point selection (line 2) and the way the binary function $f$ is called (line 7).

---

METHOD 1 - BEGIN CONSTRUCTION

1: Input: Base vector set S, sample query vector set Q, maximum vertex degree $M_x$ for base data, maximum vertex degree $M_q$ for queries, priority queue size k for searching neighbors, and ranking measure f(x, q).
2:    Initialize graph G = Ø
3:    for each x in S do
4:      Create a node for x in G
5:      Search k vertices {$p_i$} on G by SearchB(x, G, k, f) that have largest values with x in f(x, $p_i$), place them in descending order.
6:      C ← Ø. H ← Ø.
7:      for i ← 1 to k do
8:        if $p_i$ not in H then
9:          C ← C ∪ {$p_i$}
10:         Add all neighbors' neighbors of $p_i$ to H.
11:         Add an edge from x to $p_i$ to G
12:        if |C| = $M_x$ then
13:          break
14:    for each q in Q do
15:      Create a node for x in G
16:      Search k vertices {$p_i$} on G by SearchQ(q, G, k, f) that have largest values with q in f($p_i$, q), place them in descending order.
17:      C ← Ø. H ← Ø.
18:      for i ← 1 to k do
19:        if $p_i$ not in H then
20:          C ← C ∪ {$p_i$}
21:         Add all neighbors' neighbors of $p_i$ to H.
22:         Add edge {$p_i$, q} to G
23:        if |C| = $M_q$ then
24:          break
25:    output: index graph G

---

METHOD 2 - Base Data Search on BEGIN SearchB(x, G, k, f)

1: Input: Base data point x, bipartite graph G = ($V_q$, $V_x$, E), priority queue size k and similarity measure f(x, q).
2: Randomly choose a vertex p ∈ $V_q$ as the start point and initialize the priority queue A ← {< f(x, p), p >}.
3: Set p as checked and the rest of vertices as unchecked.
4: while A does not converge do //A is still updated with further greedy search.
5:    Add unchecked neighbors' neighbors of the top element in A to A. // Neighbors' neighbors of a query are queries.

| METHOD 2 - Base Data Search on BEGIN SearchB(x, G, k, f) |
| --- |
| 6:     Set vertices in A as checked. |
| 7:        A ← top-k elements of v ∈ A in descending order of f(x, v). |
| 8:     Output: A. |

| METHOD 3 - Query Search on BEGIN SearchQ(q, G, k, f) |
| --- |
| 1:     Input: Query element q, bipartite graph G = ($V_q$, $V_x$, E), priority queue size k and similarity measure f(x, q). |
| 2:     Randomly choose a vertex p ∈ $V_x$ as the start point and initialize the priority queue A ← {< f(p, q), p >}. |
| 3:     Set p as checked and the rest of vertices as unchecked. |
| 4:     while A does not converge do |
| 5:        Add unchecked neighbors' neighbors of the top element in A to A. //Base data's neighbors' neighbors are base data again. |
| 6:        Set vertices in A as checked. |
| 7:        A ← top-k elements of v ∈ A in descending order of f(v, q). |
| 8:     Output: A. |

2. Two-Hop Edge Selection Embodiments

Figure 4A:
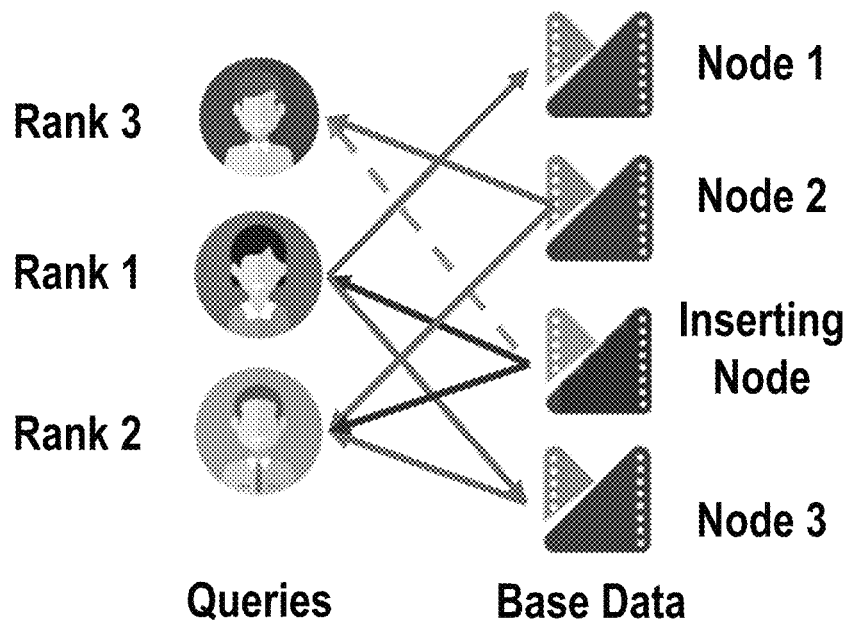
FIG. 4A depicts a native non-selection method where the top candidates are connected.
Figure 4B:
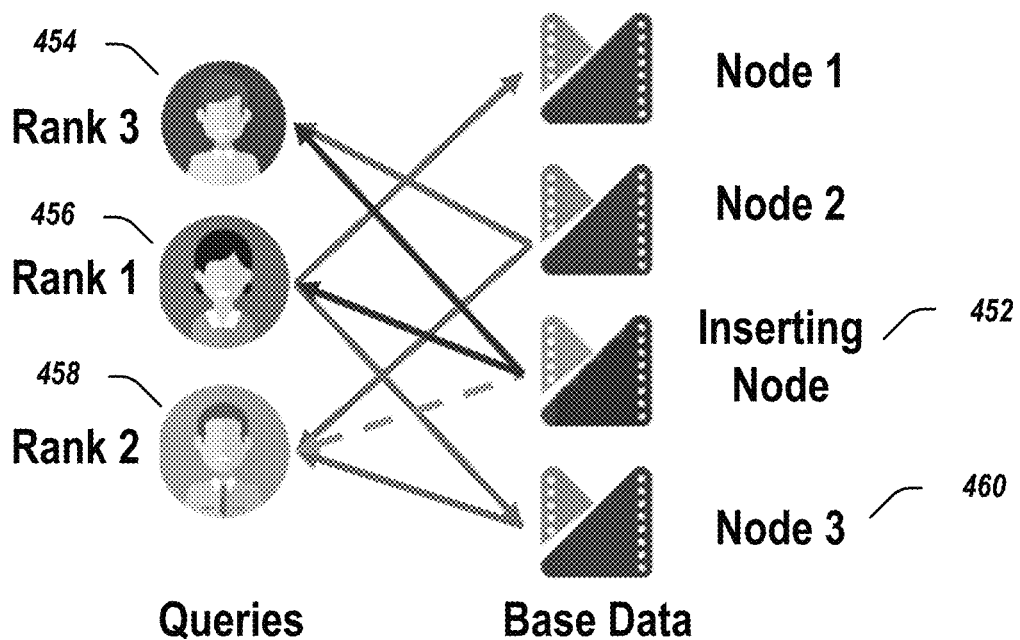
FIG. 4B depicts an edge selection method where diverse candidates are connected by a two-hop selection method, according to embodiments of the present disclosure.

Graph-based ANN methods commonly employ some edge selection method that restricts node degrees to improve searching efficiency. It has been shown that a carefully designed edge selection method is vital for searching effectiveness with restricted degrees. In one or more embodiments, BEGIN implementations utilize a two-hop edge selection method for the bipartite graph structure. Assuming a base data point 452 (labeled "Inserting Node" in FIG. 4B) is inserted, a base data greedy search method, such as Method 2, may be utilized to obtain top query candidates (labeled "Rank 1," "Rank 2," and "Rank 3," in FIG. 4A). FIG. 4A represents the native non-selection method where the top $M_x$ (here, $M_x$=2) candidates are connected. Since such a non-selection method would connect too many similar candidates, in one or more embodiments, the exemplary two-hop selection method (illustrated by FIG. 4B) may be used to connect to diverse candidates to diversify the connection as follows: The top 1 candidate 456 (i.e., Rank 1) may be connected first. For other candidates, it may be determined whether these can be reached in two hops from any selected candidates. For example, in FIG. 4B, candidate 458 can be reached from candidate 456 in two hops via node 460. Thus, candidate 458 is not selected, while candidate 454 is connected since it cannot be accessed in two hops via candidate 456. Similar to inserting base data, edge selection for inserting sample queries may be performed accordingly. Details for the two-hop edge selection may be found, e.g., in lines 5-12 and 16-23 of exemplary Method 1.

In one or more embodiments, to ensure the constructed graph is connected, for each inserting data point, one outgoing edge to a randomly picked node may be preserved. Other edges may be constructed by the two-hop edge selection method. The idea is similar to the long-range edge in HNSW. In this way, isolated clusters may be connected.

3. Random Query Generation Embodiments

In one or more embodiments, BEGIN may be used to construct bipartite graphs, e.g., by using query vector samples that may be generated in model training. For example, when training models for question answering, intermediate embedding vectors for questions (i.e., queries) in the training dataset may be obtained. In one or more embodiments, if there are no sufficient existing queries, query samples may be randomly generated, e.g., based on existing query samples, by using any of the following methods:

Uniform: Existing query vectors may be scanned to obtain minimum and maximum values on each dimension. Then vectors may be generated such that the values on each dimension are uniformly distributed, e.g., within an interval [min, max].

Normal: Similar to the Uniform method, sample mean and standard deviation of existing query vectors may be computed, and vectors may be generated from a Normal distribution, e.g., according to the sample mean and standard deviation for each dimension.

Duplicate: To generate a query vector, an existing query vector may be randomly selected and random noise (e.g., ±1%) may be added to each dimension independently.

Midpoint: For each generated query, an existing query, $q_1$, may be randomly selected. Then, e.g., 100 vectors may be randomly chosen from existing queries to find the furthest query from $q_1$ (denoted $q_2$). The generated query represents the middle point between $q_1$ and $q_2$, i.e., $(q_1+q_2)\times 0.5$. Intuitively, it is anticipated that the midpoints compensate gaps between different sample query clusters such that the query vector space is filled well.

As it is unclear how to theoretically determine which random query sample generation method might perform the best, these alternatives are experimentally compared in Section C, below. It is noted that in order to facilitate fair comparisons, query samples used in bipartite graph construction or random query generation may be separated from testing queries.

4. Fast Search on BEGIN Embodiments

Figure 5A:
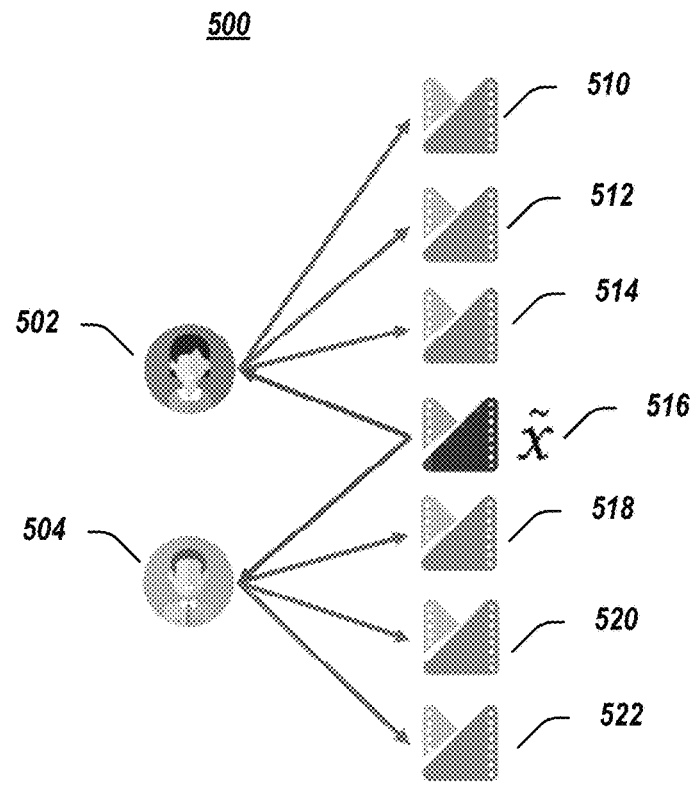
FIG. 5A depicts an exemplary online query search method where neighbors' neighbors of the current base data point are checked, according to embodiments of the present disclosure.

In one or more embodiments, online query search involves a greedy search on a constructed bipartite graph. As depicted in FIG. 5A, which represents an exemplary online query search method, directly employing the query search in Method 3 may lead to sub-optimal results since in each step all neighbors' neighbors of the current base data point, x̃ (labeled 516) are checked, $M_x*M_q$ in total. As shown, the current node x̃ 516 has two query neighbors 502 and 504, and each query neighbor has three base data neighbors 510-514 and 518-522, respectively. The six candidates 510-

514 and 518-522 are checked by evaluating $f(x, q)$. Then, the next best base data $\tilde{x}$ is chosen from these six candidates.

Figure 5B:
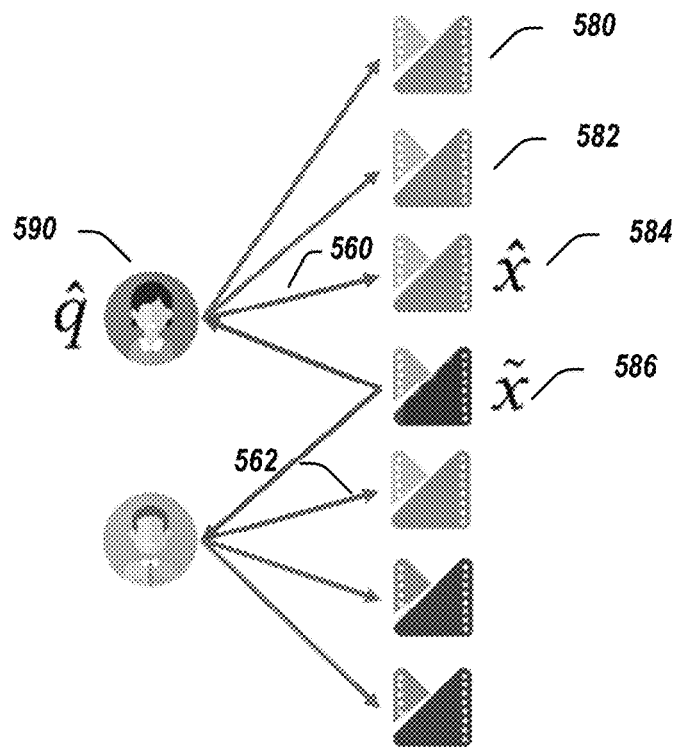
FIG. 5B depicts an exemplary online query search method where only top neighbors' neighbors are checked, according to embodiments of the present disclosure.

To improve ranking performance, one or more embodiments may use a fast search method, such as Method 4, represented by FIG. 5B. As depicted by arrows 560 and 562, first the top two-hop neighbor 584 (labeled 2) may be found, e.g., by checking each one-hop neighbor's first neighbor (neighbors are stored in order). Then, the corresponding one-hop neighbor 580 (labeled q) may be obtained. The other (unchecked) neighbors of 590 (labeled q) may then be checked. In this way, at most $M_x + M_q - 1$ nodes 580-586 are checked when using this fast search embodiment. In practical implementations, $M_x$ and $M_q$ are typically larger than those shown in online query search method depicted in FIG. 5B, e.g., 16 or 32, making the superiority of fast search more easily apparent (i.e., $M_x * M_q$ vs. $M_x + M_q - 1$).

---

METHOD 4 - Fast Query Search on BEGIN FastSearch(q, G, k, f)

---

1: Input: query element q, bipartite graph G = ($V_q$, $V_x$, E), priority queue size k, and similarity measure f(x, q).
2: Randomly choose a vertex p ∈ $V_x$ as the start point and initialize the priority queue A ← {< f(p, q), p >}.
3: Set p as checked and the rest of vertices as unchecked.
4: while A does not converge do
5:     Get the top element $\tilde{x}$ of A.
6:     Check $\tilde{x}$'s neighbors' first unchecked elements ($\tilde{x}$'s two-hop neighbors) and find $\max_{\hat{x}} f(\hat{x}, q)$. Record the corresponding $\tilde{x}$'s one-hop neighbor $\hat{q}$. //See FIG. 5B.
7:     Add unchecked neighbors of $\hat{q}$ to A.
8:     Set vertices in A as checked.
9:     A ← top-k elements of v ∈ A in order of f(v, q).
10:     Output: A.

---

FIG. 6 is a flowchart of an illustrative process for generating a bipartite graph to determine relevant results given an input query, according to embodiments of the present disclosure. In one or more embodiments, process 600 may begin when, given at least a base element set, a query element set, and a binary function that defines a relevance measure, a bipartite graph is initialized (605). It may be determined (610) whether a stop condition has been reached. If not, steps may be iterated that comprise: inserting (620) a base element that has been selected from the base element set into the bipartite graph; using (625) a base element search to search vertices in the bipartite graph to identify top query element candidates that are ranked according to the relevance measure; responsive to a number of outgoing edges for the base element not being exceeded, using (630) a two-hop edge selection process to add directed edges from the base element to each query element from the top query element candidates that cannot be reached in two hops from a selected query element; inserting (635) a query element that has been selected from the query element set into the bipartite graph; using (640) a query element search to identify top base element candidates in the bipartite graph that are ranked according to the relevance measure; and, responsive to a number of outgoing edges for the query element not being exceeded, using (645) the two-hop edge selection process to add directed edges from the query element to each base element from the top base element candidates that cannot be reached in two hops from a selected base element. Conversely, if it is determined (610) that the stop condition has been reached, the bipartite index graph may be output (615).

One skilled in the art shall recognize that herein: (1) certain steps may optionally be performed; (2) steps may not be limited to the specific order set forth herein; (3) certain steps may be performed in different orders; and (4) certain steps may be done concurrently.

Figure 7B:
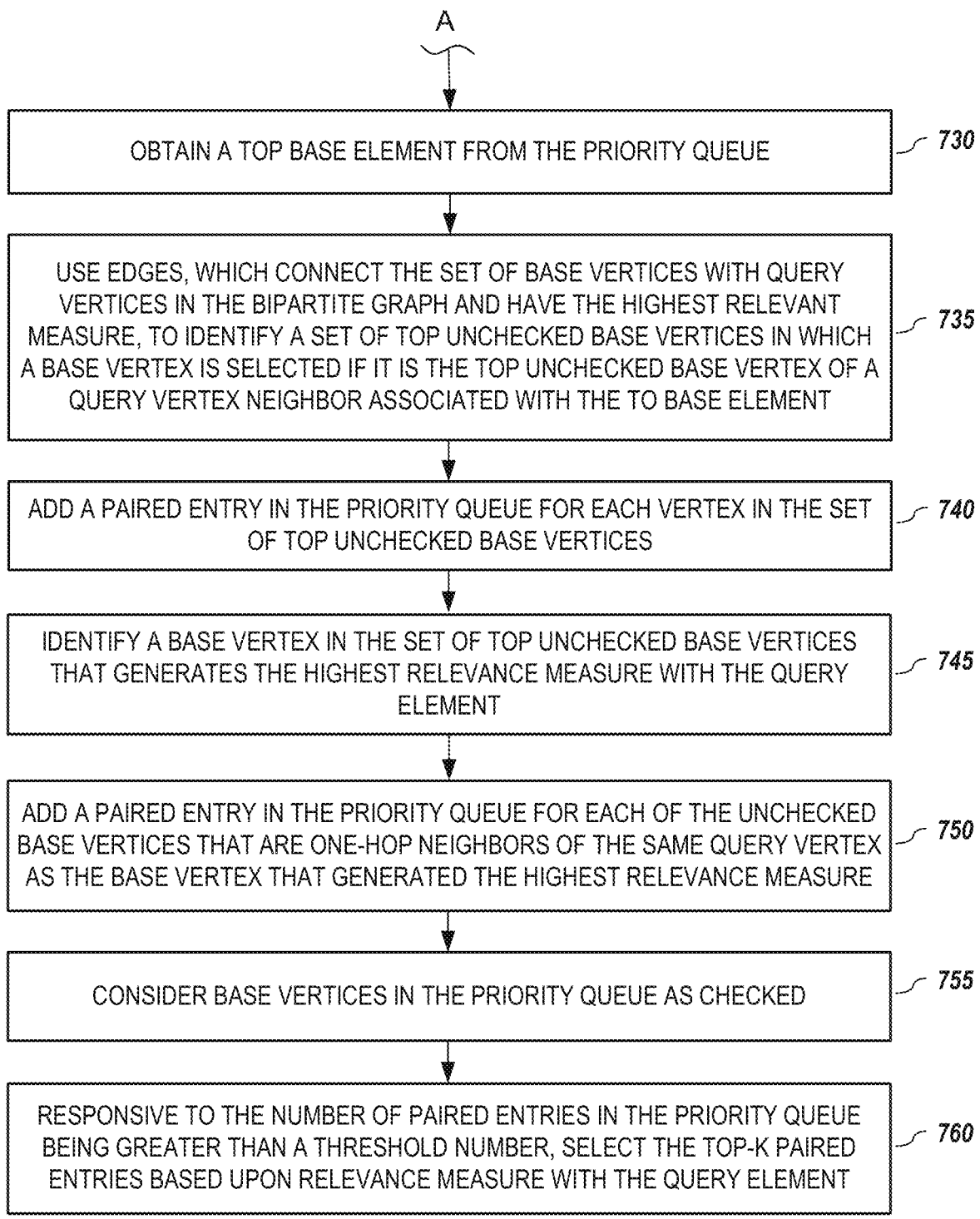

FIGS. 7A and 7B is a flowchart of an illustrative process for searching on a bipartite graph to determine relevant results given an input query, according to embodiments of the present disclosure. In one or more embodiments, process 700 may begin when, given at least a query element, a bipartite graph, and a binary function, which given a base element and the query element provides a relevance measure, a base vertex on the bipartite graph is randomly selected (705) as a starting point from a set of base vertices.

The base vertex may be used (710) to initialize a priority queue with a paired entry comprising: (1) the relevance measure obtained using the base vertex and the query element as inputs to the binary function and (2) the base vertex or an identifier of the base vertex. The base vertex may be considered (715) as checked, and the remainder of the set of base vertices may be considered unchecked.

Responsive to determining (720) that a stop condition has not been met, process 700 may iterate steps comprising: obtaining (730) a top base element from the priority queue; using (735) edges, which connect the set of base vertices with query vertices in the bipartite graph and have the highest relevant measure, to identify a set of top unchecked base vertices in which a base vertex is selected if it is the top unchecked base vertex of a query vertex neighbor associated with the top base element; adding (740) a paired entry in the priority queue for each vertex in the set of top unchecked base vertices; identifying (745) a base vertex in the set of top unchecked base vertices that generates the highest relevance measure with the query element; adding (750) a paired entry in the priority queue for each of the unchecked base vertices that are one-hop neighbors of the same query vertex as the base vertex that generated the highest relevance measure; considering (755) base vertices in the priority queue as checked; and responsive to the number of paired entries in the priority queue being greater than a threshold number, selecting (760) the top-k paired entries.

Conversely, responsive to determining (720) that the stop condition has been met, a set of top base elements may be output (725) given the query element. In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

C. Experimental Results

It shall be noted that experiments and results are provided by way of illustration and were performed under specific conditions using a specific embodiment or embodiments; accordingly, neither these experiments nor their results shall be used to limit the scope of the disclosure of this patent document.

BEGIN embodiments are evaluated with five ranking measures, including two synthetic measures and three neural network-based measures.

(1) All-Element-Sum: $f_{All\text{-}Element\text{-}Sum}(x,q)=\Sigma_i x_i + \Sigma_j q_j$. This measure accumulates the elements of the base vector and the query vector and returns a sum.

(2) Round-Sum: This function re-processes the result of the All-Element-Sum measure to produce a more sophisticated and non-convex measure:

$$f_{Round\text{-}Sum}(x,q) = \text{round}((\Sigma_i x_i + \Sigma_j q_j) \times 10000) \bmod 100.$$

(3) MLP-Concate: This measure is a neural network based on MLP, a neural network-based recommendation method. The MLP model first concatenates user latent vectors and item latent vectors before going through the Multi-Layer Perceptron network.

(4) MLP-Em-Sum: This measure transforms two types of vectors into a common space using an additional embedding layer and conducts element-wise sum operations before going through the MLP network. The vector dimensions of MLP-Concate and MLP-Em-Sum are set as 32 herein.

(5) DeepFM: This measure combines the power of factorization machines for recommendation and deep learning for feature learning in a new neural network architecture. The factorization part dimension herein is set as 8 and the deep learning part is set as 32. The total dimension for both users and items is 40. Table 1 summarizes the datasets used herein:

TABLE 1

Dataset Statistics.

|  | # Index Vectors | # Queries | # Dimensions |
|---|---|---|---|
| Dataset 1 | 25,815 | 25,677 | 32 |
| Dataset 2 | 209,172 | 162,542 | 40 |
| Dataset 3 | 1,058,415 | 25,677 | 32 |
| Dataset 4 | 3,826,085 | 182,032 | 40 |

MLP-Concate and MLP-Em-Sum are trained on Dataset 1, and DeepFM is trained on Dataset 2 and Dataset 3. In addition, the simulation dataset in Dataset 4 is included. It is generated based on MLP-Concate trained on the first dataset by randomly generating 40 simulation data points by Gaussian distribution with the original data as mean and 0.1 as the standard deviation. The two measures All-Element-Sum and Round-Sum may be tested on any randomly generated vectors, here, vectors generated by MLP-Concate on the Dataset 1 are used. For each dataset, 1000 queries are used as searching queries and the rest is used for random query generation.

1. Baselines

Few previous methods focus on the OBFS problem. SL2G is considered the first solution. Another baseline is designed based on sample queries.

SL2G: As introduced in Section A.3, SL2G constructs $\ell_2$ graph only on base data and conducts a greedy search on the graph by using the focus ranking measure $f$.

Sample-Ave: As precisely mentioned, constructing a graph index by distance or relevance between base data (e.g., in SL2G) is problematic for complex ranking measures. To verify this, another method based on estimating base data distances is designed:

1. Generate a query sample set Q, such as 1,000 query vectors, that are separate from the final test set.
2. Approximate the distance between two base data points, $x_i$ and $x_j$, by using:

$$\widehat{f_{Dis}}(x_i, x_j) = \frac{\sum_{q \in Q} |f(x_i, q) - f(x_j, q)|}{|Q|}.$$

The graph construction of this method is time-consuming as the neural network needs to be called 2,000 (i.e., 2*|Q|) times to compute one base-to-base ($x_i$, $x_j$) distance. The estimated distance of Sample-Ave may be more proper than the one estimated by $\ell_2$ distance.

It is noted that no comparison is made with other traditional ANN search algorithms, such as ANNOY and HNSW, as most of these are not designed for the generic ranking problem, OBFS, or specifically fast neural ranking. It has been demonstrated that these methods are dramatically worse than SL2G when applied on fast neural ranking.

2. Experimental Settings

To generate labels, most relevant base data points for each query are calculated using each corresponding binary function $f$. Experiments on top-1 and top-10 labels are recorded. It is noted that for neural network-based ranking measures, one binary function $f$ corresponds to one network structure (e.g., MLP-Concate) trained on one dataset.

For evaluation measures, Recall vs. Time (queries per second) and Recall vs. Computations (percentage of pair-wise computations) are used to evaluate the searching performance of different methods. Recall vs. Time reports how many queries a method can process per second at each recall level. Recall vs. Computations reports the amount or percentage of pair-wise computations that a search method costs at each recall level. Both of these perspectives are shown in the following experiments for a comprehensive evaluation. Recall is $$\frac{|A \cap B|}{|B|},$$

where A is the return item set, and B is the ground truth set. Both A and B have N items for Top-N Recall. Since N items are returned for the Top-N case, Recall @N=Precision@N here.

The three methods, SL2G, Sample-Ave, and BEGIN have three common parameters: M (i.e., $M_x$ in BEGIN), $k_{construction}$, and $k_{search}$, which control the degrees of vertices and the number of search attempts. BEGIN has an additional parameter, $M_q$, for the degree of query points. To make a fair comparison, these parameters are varied over a fine grid. For each method in each experiment, there are multiple points scattered on the plane. To plot curves, first, the best recall number, max-recall, is determined. Then 100 buckets are produced by evenly splitting the range from 0 to max-recall. For each bucket, the best result along the other axis (e.g., the highest queries per second or the lowest percentage of pair-wise computations) is chosen. In other words, the parameters that maximize the performance in a given recall range are selected.

3. Results for Synthetic Measures

Figure 8:
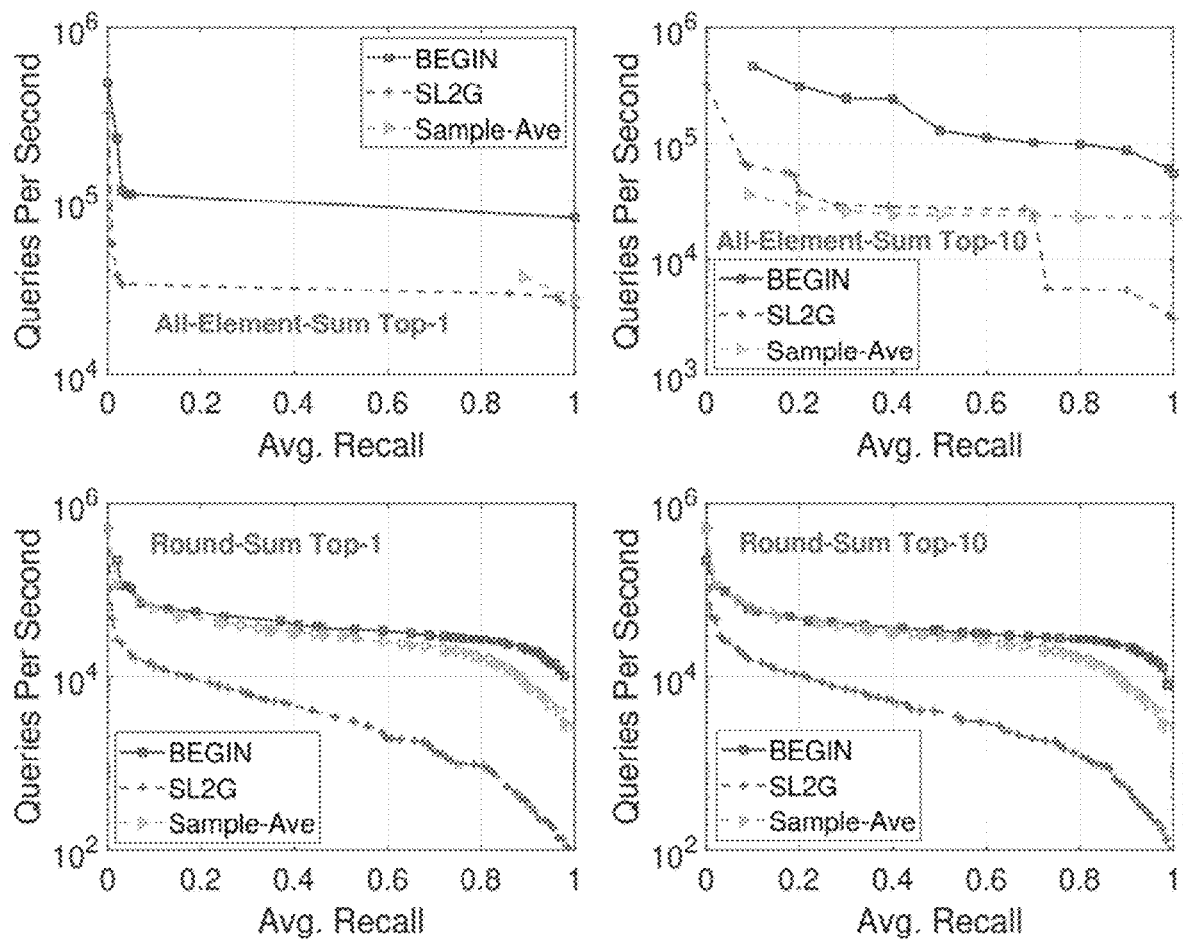
FIG. 8 depicts experimental results for synthetic measures, All-Element-Sum and Round-Sum, in Recall vs. Time, according to embodiments of the present disclosure.
Figure 9:
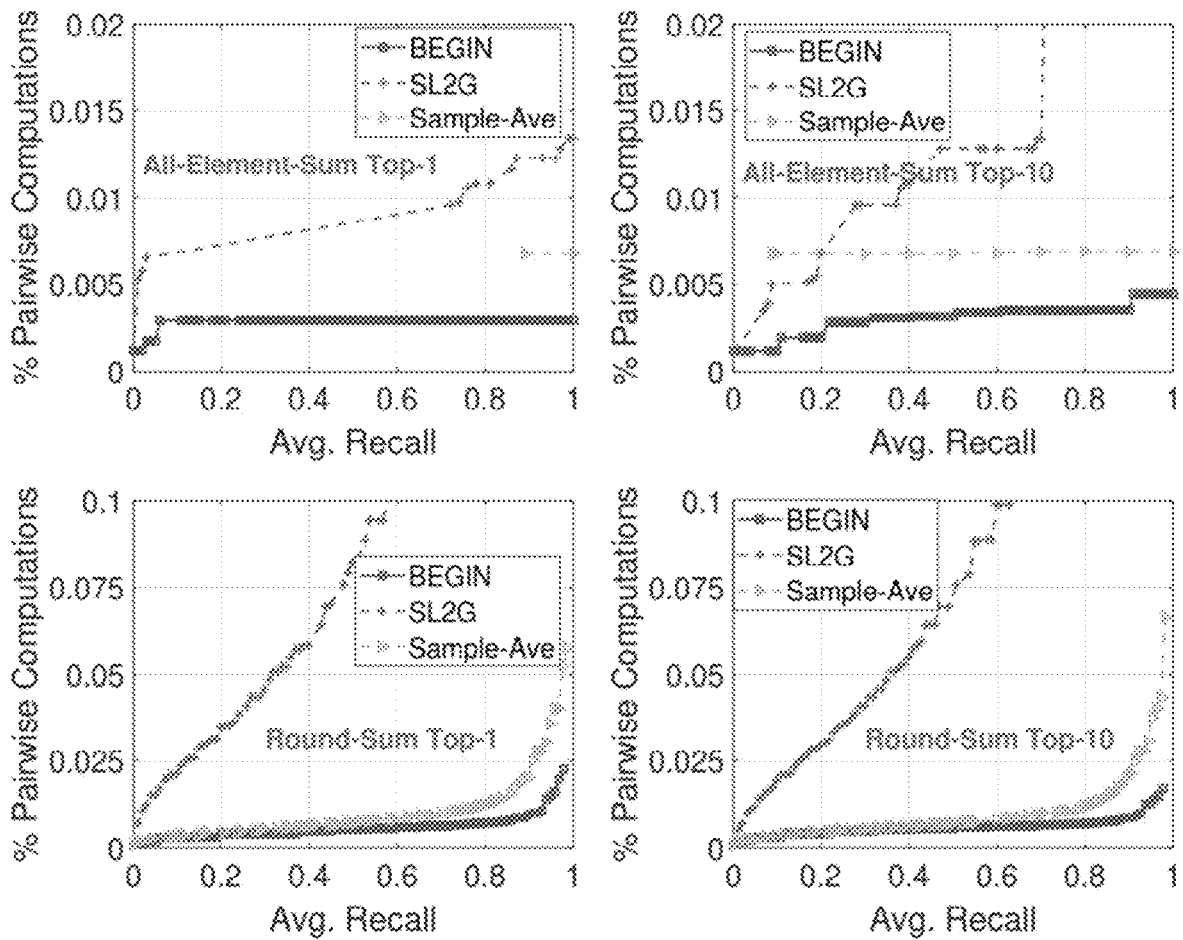
FIG. 9 depicts experimental results for synthetic measures in Recall vs. (percentage of pairwise) Computations, according to embodiments of the present disclosure.

Experimental results on synthetic ranking measures are shown first. FIG. 8 depicts experimental results for synthetic measures—All-Element-Sum and Round-Sum—in Recall vs. Time, according to embodiments of the present disclosure. The best results are in the upper right corner. Each row is for each ranking measure, All-Element-Sum or Round-Sum. Results for Top-1 and Top-10 labels are represented in two columns. Correspondingly, FIG. 9 shows experimental results for synthetic measures in Recall vs. (percentage of pairwise) Computations, according to embodiments of the present disclosure. The best results are in the lower right corner.

Both of the two evaluation metrics indicate similar trends in comparison. The designed baseline Sample-Ave works better than previous state-of-the-art, SL2G. As introduced above, Sample-Ave estimates the distance between base data by sampled queries. That will make more sense than estimating the distance by $\ell_2$ distance. Although Sample-Ave shows superiority over SL2G, it is difficult to apply it in real-world systems. Sample-Ave requires multiple times of $f(x, q)$ computations (i.e., the size of query sample set) for each pair of base data points. It will take a long time to construct indices for large datasets.

In contrast, BEGIN performs significantly better than the two baselines. No matter whether the ranking measure is a simple function (i.e., All-Element-Sum) or a complex non-convex function (i.e., Round-Sum), BEGIN works consistently well. One main reason is that BEGIN does not need to estimate the distance between base data but explores a ranking function directly. As analyzed above, distances between base data are not well-defined, recalling the example of recommendation in Section A.3. An estimated distance between base data may be good for some queries but may hurt the ranking performance for other queries. In one or more embodiments, by bypassing estimating distances, the bipartite graphs represent relationships between base data in the neighbor intersection, which is more flexible for different queries.

4. Results Neural Network Measures

Figure 10A:
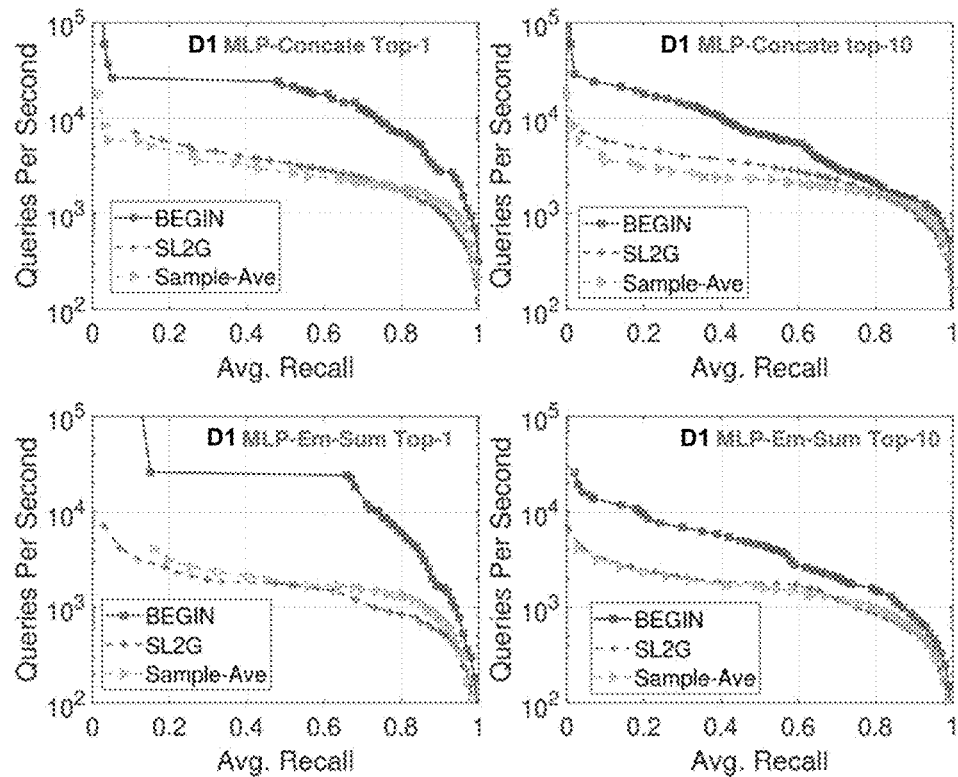
FIG. 10A-FIG. 10C depict experimental results for neural network measures from the view of Recall vs. Time, according to embodiments of the present disclosure.
Figure 10B:
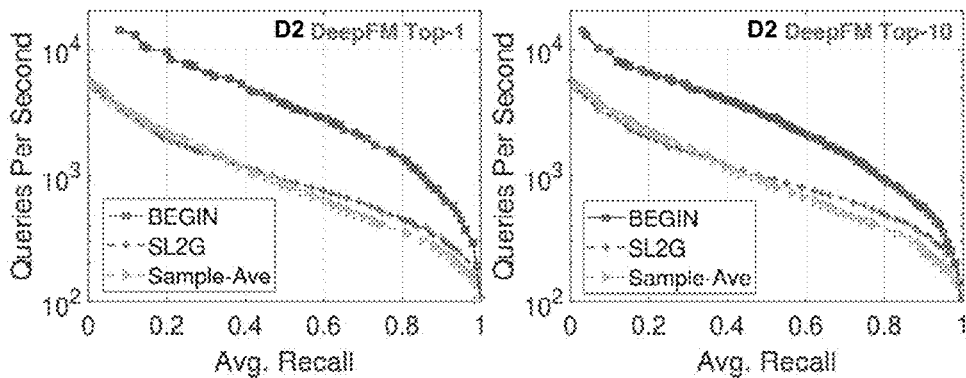
Figure 10C:
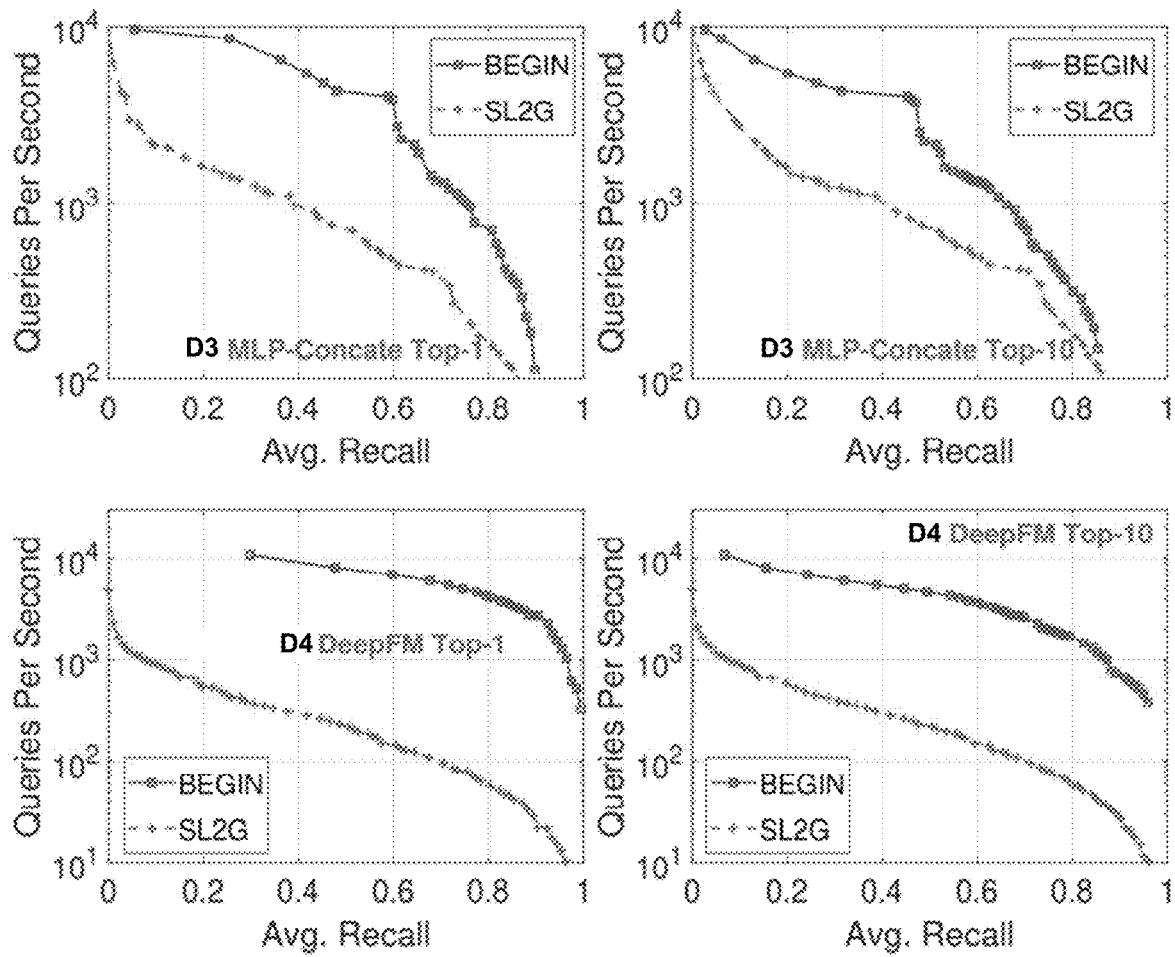
Figure 11:
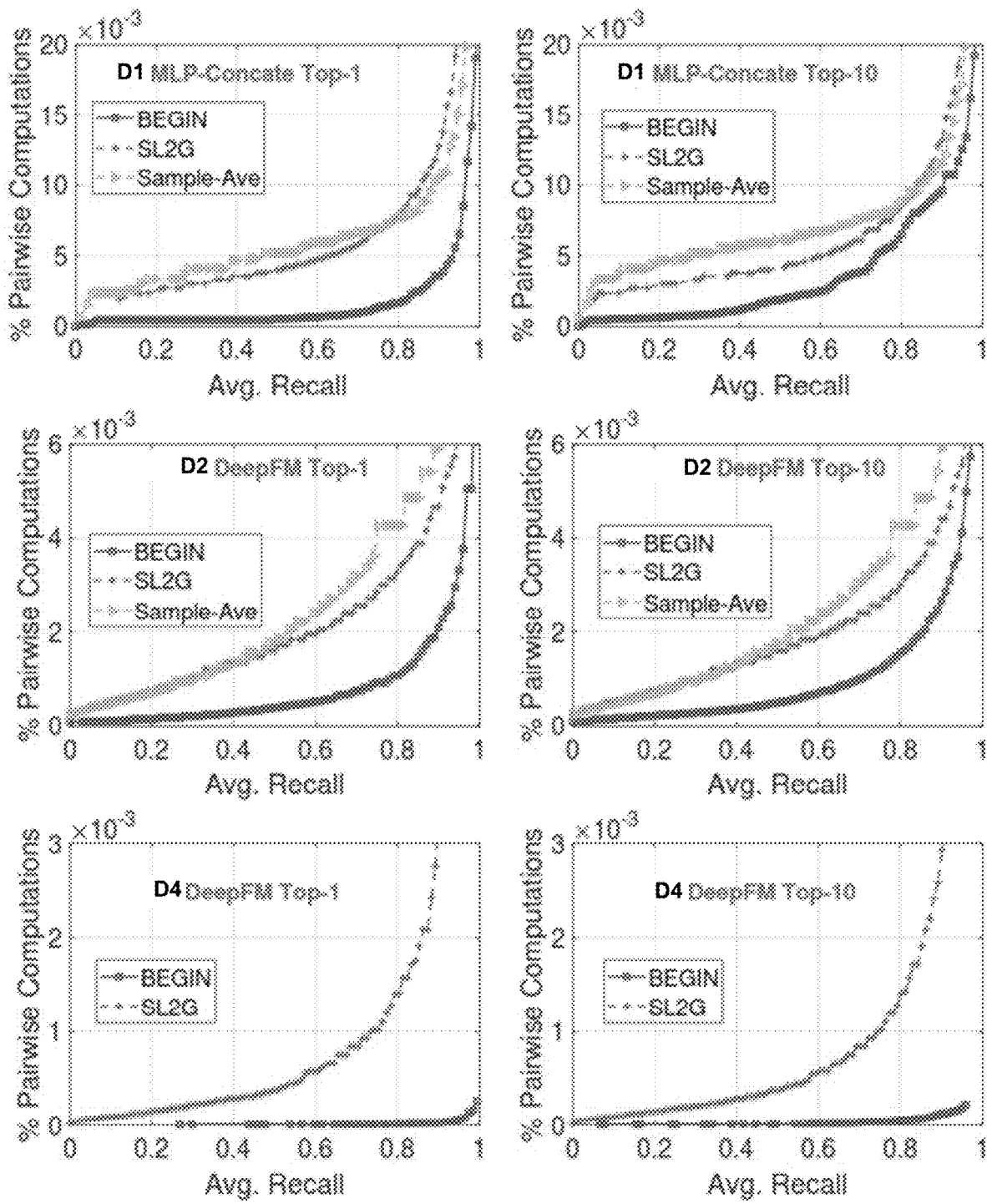
FIG. 11 depicts experimental results for the neural network measures from the view of Recall vs. Computations, according to embodiments of the present disclosure.

This section introduces experimental results for neural network-based ranking measures. Experimental results by two evaluation metrics are shown in FIG. 10A-FIG. 10C and FIG. 11, according to embodiments of the present disclosure. FIG. 10A-10C depict experimental results for neural network measures from the view of Recall vs. Time. The best results are shown in the upper right corner. FIG. 11 depicts experimental results for the neural network measures from the view of Recall vs. Computations. The best results are shown in the lower right corner. Results via the view of Recall vs. Computations are shown only for partial datasets. Other results have similar trends. It is noted that results for Sample-Ave are not shown for the relatively large datasets, Dataset 3 and Dataset4, since Sample-Ave is too time-consuming in index construction for these sizes of datasets. As can be seen, BEGIN works better than baseline methods, especially for Top-1 recalls. On these neural network ranking measures, Sample-Ave works similarly to SL2G, and is not better than SL2G as on synthetic ranking measures. The reason is that neural network-based ranking measures are much more complicated than synthetic ranking ones. As analyzed above, SL2G and Sample-Ave are problematic in estimating the distance between base data. The issue becomes more obvious on these complex ranking measures. In contrast, BEGIN works consistently well in various cases, thus, demonstrating the superiority of the bipartite graph structure.

Scalability of BEGIN. Dataset 3 and Dataset 4 are much larger, having more than 1 million and 3 million base vectors. As can be seen, the gap between BEGIN and SL2G is even greater on these larger datasets. For example, on Dataset 4, to achieve 80% Top-1 recall, SL2G can handle 57 queries per second. To achieve the same recall level, BEGIN can process 4,366 queries per second, i.e., 76 times faster than SL2G. This demonstrates that BEGIN poses a better performance in scalability, which is vital for real-world applications.

5. Evaluation of Query Generation Methods

Figure 12:
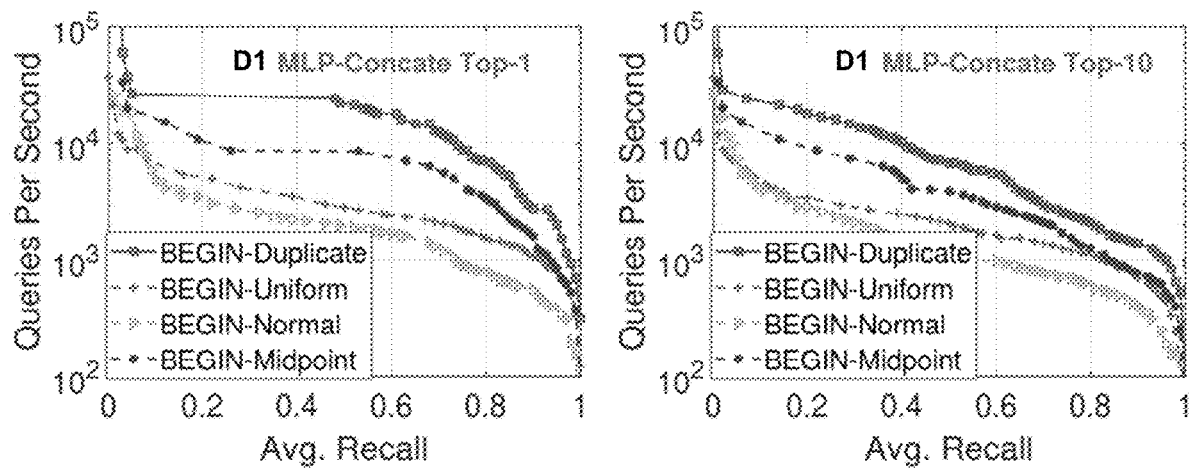
FIG. 12 depicts experimental results for various query sample generation methods, according to embodiments of the present disclosure.

FIG. 12 depicts experimental results for different query sample generation methods, according to embodiments of the present disclosure, introduced above in Section B.3. Only results for MLP-Concate on the Dataset 1 are shown. Among the four methods, the Duplicate method shows superiority in ranking performance. The second best method is Midpoint, and Normal performed worst of the four methods. The results indicate that the original distribution of query data matters in bipartite graph construction. Duplicate works best since it keeps the original data distribution well. Midpoint has similar distribution with the original data, too. Normal generates the set in a new distribution that would be very different from the original distribution, thus, it is worse than Uniform.

Figure 13:
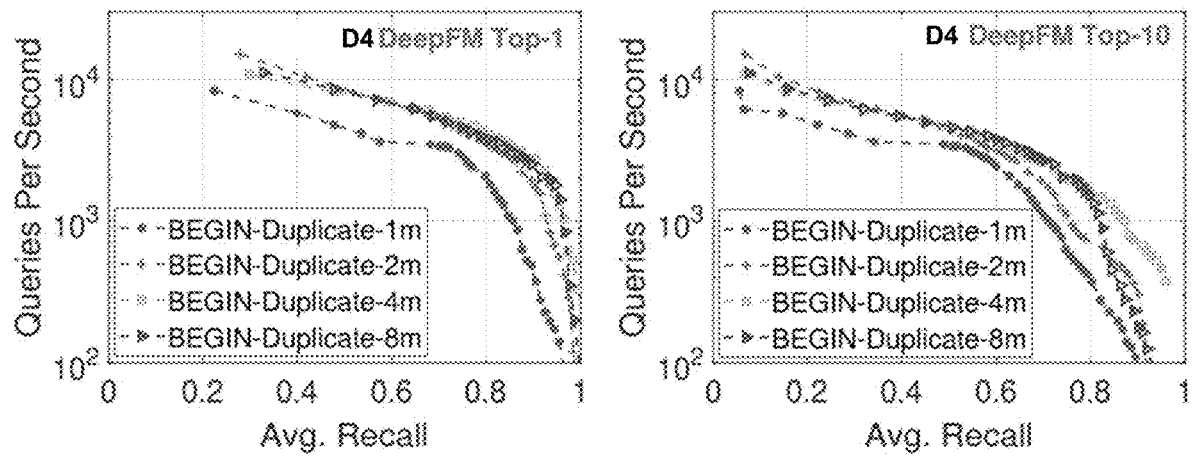
FIG. 13 depicts experimental results for different amounts of generated query samples, according to embodiments of the present disclosure.

The performance in different amounts of generated query samples is examined. Results for the Duplicate method on Dataset 4 are shown in FIG. 13, which depicts experimental results for different amounts of generated query samples, according to embodiments of the present disclosure. The number of base vectors in this Dataset is about 3.8 m. BEGIN-Duplicate-4 m has slightly better results. In other experiments, similar amounts of query samples were generated as base vectors using the Duplicate method. As can be seen, the performance of BEGIN is not sensitive to query sample size. Generally, it may be advantageous to have a query sample size that is comparable to the base vector size (e.g., 0.5-2 times of base vectors) since degrees of nodes are restricted in the bipartite graph. If the presence of one kind of node (query samples or base vectors) is extremely lower than the other, it may cause the graph to be unconnected.

6. Evaluation of Search Methods

Figure 14:
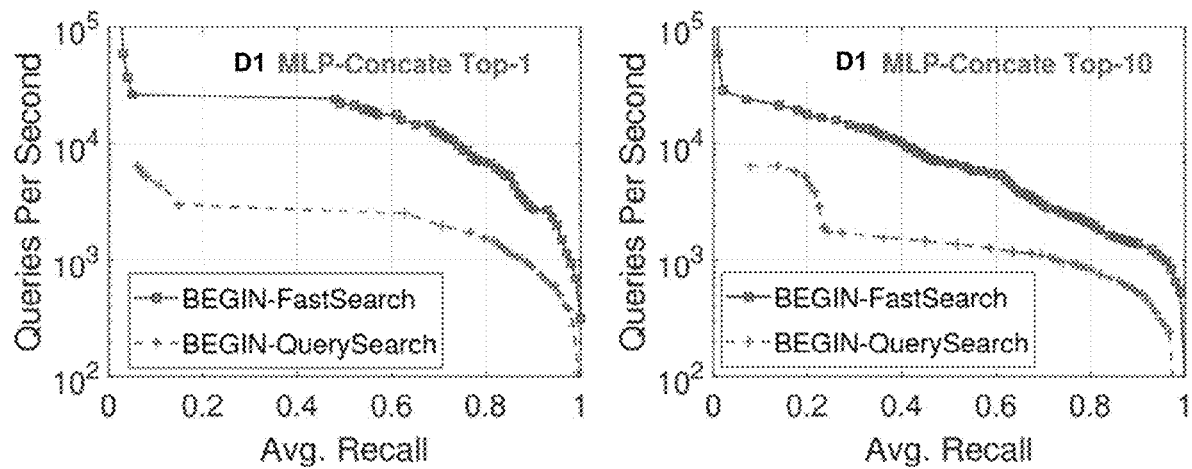
FIG. 14 depicts a performance comparison of two search methods, Query-Search and FastSearch, according to embodiments of the present disclosure.

After constructing bipartite graph indices, methods for conducting online/fast query search may be designed, e.g., Method 3 and Method 4. A performance comparison of these two search methods, Query-Search and FastSearch, is depicted in FIG. 14. Only results on Dataset 1 are shown. As can be seen, Method 4 (FastSearch) is significantly more efficient than the native QuerySearch. As discussed in Section B.4, Method 4 reduces the comparison amount from $M_x * M_q$ to $M_x + M_q - 1$ (i.e., from $O(N^2)$ to $O(N)$, where N is the degree of nodes). This optimization (FastSearch) is enabled in all comparisons with SL2G.

D. Some Conclusions/Observations

Neural networks are more powerful for modeling complex relationships between vectors than simple vector distances, such as $\ell_2$ distance, cosine similarity, and inner product. However, to efficiently rank vectors according to neural network measures is difficult as neural network measures are computation-intensive. The complexities of these measures bring challenges in constructing indices for fast vector retrieval. Although existing methods extend traditional ANN search, define the fast neural ranking problem formally as OBFS, and provide SL2G as a simple solution, SL2G is problematic as it tries to estimate distances between base data, which are undefined. Therefore, various embodiments herein construct BEGIN, which bypasses estimating distances among base data and constructs indices by using the focus ranking measure $f$. Based on bipartite graph indices, the FastSearch method is employed. Experiments evaluate the method on two synthetic ranking measures and three neural network measures. Results indicated that the ranking performance of BEGIN is significantly higher than those of existing methods.

E. Computing System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read-only memory (ROM), and/or other types of memory. Additional components of the computing system may include one or more drives (e.g., hard disk drive, solid-state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 15:
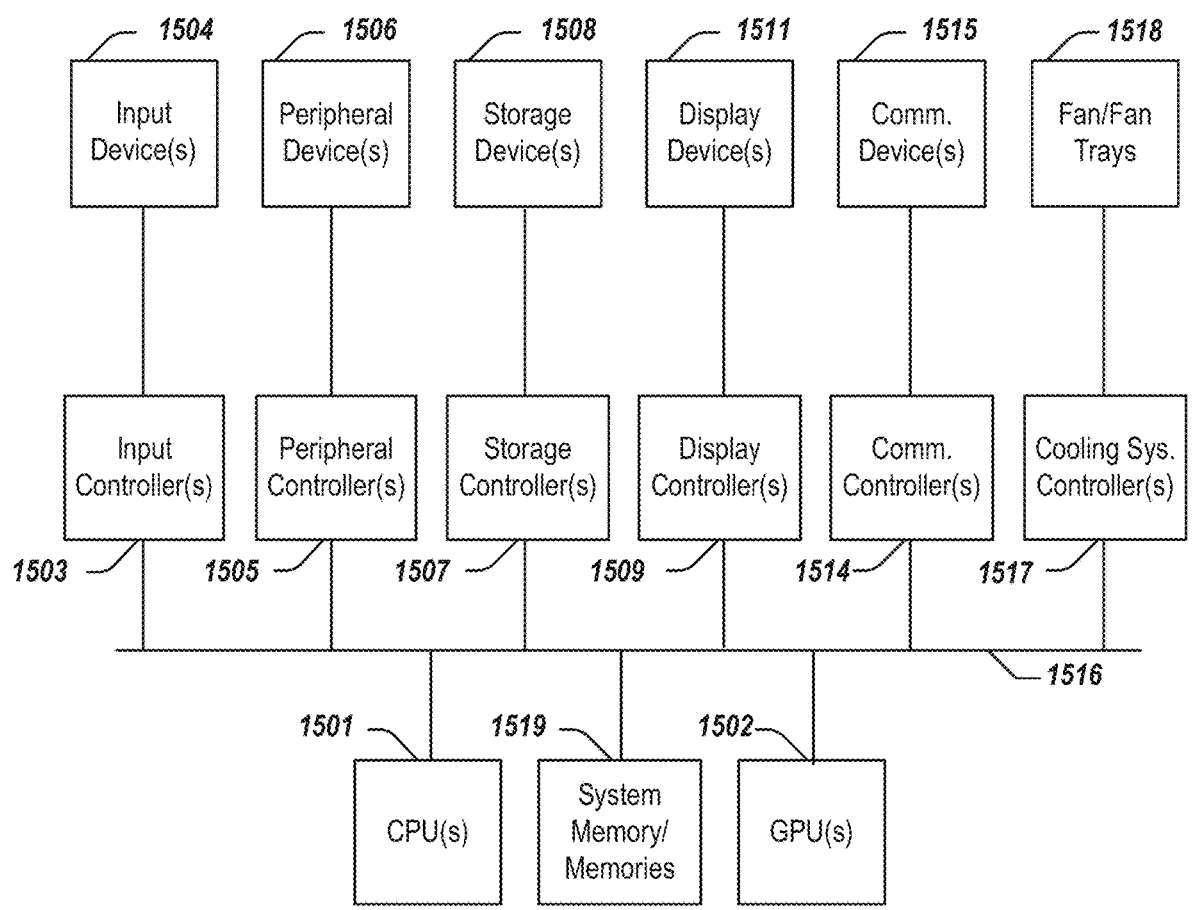
FIG. 15 depicts a simplified block diagram of a computing device/information handling system, according to embodiments of the present disclosure.

FIG. 15 depicts a simplified block diagram of an information handling system (or computing system), according to embodiments of the present disclosure. It will be understood that the functionalities shown for system 1500 may operate to support various embodiments of a computing system—although it shall be understood that a computing system may be differently configured and include different components, including having fewer or more components as depicted in FIG. 15.

As illustrated in FIG. 15, the computing system 1500 includes one or more CPUs 1501 that provides computing resources and controls the computer. CPU 1501 may be implemented with a microprocessor or the like, and may also include one or more GPUs 1502 and/or a floating-point coprocessor for mathematical computations. In one or more embodiments, one or more GPUs 1502 may be incorporated within the display controller 1509, such as part of a graphics card or cards. The system 1500 may also include a system memory 1519, which may comprise RAM, ROM, or both.

A number of controllers and peripheral devices may also be provided, as shown in FIG. 15. An input controller 1503 represents an interface to various input device(s) 1504. The computing system 1500 may also include a storage controller 1507 for interfacing with one or more storage devices 1508 each of which includes a storage medium such as magnetic tape or disk, or an optical medium that might be used to record programs of instructions for operating systems, utilities, and applications, which may include embodiments of programs that implement various aspects of the present disclosure. Storage device(s) 1508 may also be used to store processed data or data to be processed in accordance with the disclosure. The system 1500 may also include a display controller 1509 for providing an interface to a display device 1511, which may be a cathode ray tube (CRT) display, a thin film transistor (TFT) display, organic light-emitting diode, electroluminescent panel, plasma panel, or any other type of display. The computing system 1500 may also include one or more peripheral controllers or interfaces 1505 for one or more peripherals 1506. Examples of peripherals may include one or more printers, scanners, input devices, output devices, sensors, and the like. A communications controller 1514 may interface with one or more communication devices 1515, which enables the system 1500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1500 comprises one or more fans or fan trays 1518 and a cooling subsystem controller or controllers 1517 that monitors thermal temperature(s) of the system 1500 (or components thereof) and operates the fans/fan trays 1518 to help regulate the temperature.

In the illustrated system, all major system components may connect to a bus 1516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable mediums including, for example, magnetic media such as hard disks, floppy disks, and magnetic tape; optical media such as compact discs (CDs) and holographic devices; magneto-optical media; and hardware devices that are specially configured to store or to store and execute program code, such as application-specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example, magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher-level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for generating a bipartite graph, the method comprising:
    given at least a base element set, a query element set, and a binary function that defines a relevance measure:
    initializing a bipartite graph;
    until a stop condition has been reached, iterating steps comprising:
        inserting a base element that has been selected from the base element set as a vertex into the bipartite graph;
        using a base element search to search vertices, which correspond to elements, in the bipartite graph to identify one or more top query element candidates that are ranked according to the relevance measure;
        responsive to a number of outgoing edges for the base element not being exceeded, using a two-hop edge selection process to add directed edges from the base element to each query element from the top query element candidates that cannot be reached in two hops from a selected query element;
        inserting a query element that has been selected from the query element set into the bipartite graph;
        using a query element search to identify one or more top base element candidates in the bipartite graph that are ranked according to the relevance measure; and
        responsive to a number of outgoing edges for the query element not being exceeded, using the two-hop edge selection process to add directed edges from the query element to each base element from the top base element candidates that cannot be reached in two hops from a selected base element; and
    outputting the bipartite graph.

2. The computer-implemented method of claim 1 wherein the two-hop edge selection process comprises alternating between inserting one or more base elements and inserting one or more query elements.

3. The computer-implemented method of claim 1 wherein the stop condition comprises: a smaller number of elements in the base element set or elements in the query element set having been inserted.

4. The computer-implemented method of claim 3 wherein, responsive to the smaller number being the number of elements in the base element set, continuing to insert query elements into the bipartite graph until all query elements are added to the bipartite graph.

5. The computer-implemented method of claim 3 wherein, responsive to the smaller number being the number of elements in query element set, continuing to insert base elements into the bipartite graph until all base elements are added to the bipartite graph.

6. The computer-implemented method of claim 1 further comprising determining relevant results given an input query by performing steps comprising:
    given at least a query element, the bipartite graph, and the binary function:
        randomly selecting, from a set of base vertices, a base vertex on the bipartite graph as a starting point;
        using the base vertex to initialize a priority queue with a paired entry comprising: (1) the relevance measure obtained using the base vertex, the query element, and the binary function and (2) the base vertex or an identifier of the base vertex;
        considering the base vertex as checked, and considering a remainder of the set of base vertices as unchecked;
        responsive to a stop condition not being met, iterating steps comprising:
            obtaining a top base element from the priority queue;
            using edges, which connect the set of base vertices with query vertices in the bipartite graph and have a highest relevant measure, to identify a set of top unchecked base vertices in which a base vertex is selected if it is the top unchecked base vertex of a query vertex neighbor associated with the top base element;
            adding a paired entry in the priority queue for each vertex in the set of top unchecked base vertices;
            identifying a base vertex in the set of top unchecked base vertices that generates the highest relevance measure with the query element;
            adding a paired entry in the priority queue for each of the unchecked base vertices that are one-hop neighbors of a same query vertex as the base vertex that generated the highest relevance measure;
            considering base vertices in the priority queue as checked; and
            responsive to a number of paired entries in the priority queue being greater than a threshold number, selecting the top-k paired entries; and
        responsive to the stop condition being met, outputting a set of top base elements given the query element.

7. The computer-implemented method of claim 1 wherein, at least one of the base element search or the query element search comprises a greedy search.

8. A computer-implemented search method to determine relevant results given an input query, the method comprising:
given at least a query element, a bipartite graph, and a binary function, which given a base element and the query element provides a relevance measure:
randomly selecting, from a set of base vertices, which correspond to base elements, a base vertex on the bipartite graph as a starting point;
using the base vertex to initialize a priority queue with a paired entry comprising: (1) the relevance measure obtained using the base vertex, the query element, and the binary function and (2) the base vertex or an identifier of the base vertex;
considering the base vertex as checked, and considering a remainder of the set of base vertices as unchecked;
responsive to a stop condition not being met, in which the stop condition comprises as a stop condition the priority queue not changing by greater than a threshold amount, iterating steps comprising:
obtaining a top base element from the priority queue;
using edges, which connect the set of base vertices with query vertices in the bipartite graph and have a highest relevant measure, to identify a set of top unchecked base vertices in which a base vertex is selected if it is the top unchecked base vertex of a query vertex neighbor associated with the top base element;
adding a paired entry in the priority queue for each vertex in the set of top unchecked base vertices;
identifying a base vertex in the set of top unchecked base vertices that generates the highest relevance measure with the query element;
adding a paired entry in the priority queue for each of the unchecked base vertices that are one-hop neighbors of a same query vertex as the base vertex that generated the highest relevance measure;
considering base vertices in the priority queue as checked; and
responsive to a number of paired entries in the priority queue being greater than a threshold number, selecting the top-k paired entries; and
responsive to the stop condition being met, outputting a set of top base elements given the query element.

9. The computer-implemented method of claim 8 wherein the priority queue has a queue size that corresponds to a number of the set of top base elements.

10. The computer-implemented method of claim 8 wherein the priority queue comprises a set of base elements that are ranked according to the relevance measure.

11. The computer-implemented method of claim 8 wherein the binary function is one of All-Element-Sum, Round-Sum, MLP-Concate, MLP-Em-Sum, DeepFM, or a neural network-based measure.

12. A computer-implemented method to determine relevant results given an input query, the method comprising:
responsive to a stop condition not being met, in which the stop condition comprises as a stop condition a priority queue not changing by greater than a threshold amount, iterating steps comprising:
given a top base element in the priority queue that uses a binary function to link a base elements and a query element according to a relevance measure, identifying, using one or more processors, one or more base vertices, which correspond to base elements, in a bipartite graph, which is stored in a computer-readable memory, that are two-hop neighbors of the top base element, each of the identified base vertices being associated with a one-hop neighbor;
selecting among the identified base vertices one that has a maximum relevance measure;
adding the selected base vertex to the priority queue;
adding those neighbors of the one-hop neighbor associated with the selected base vertex to the priority queue; and
selecting a set of top base elements from the priority queue in order of their relevance measures; and
responsive to the stop condition being met, outputting the selected set of top base elements.

13. The computer-implemented method of claim 12 wherein the priority queue comprises a set of base elements that are ranked according to the relevance measure.

14. The computer-implemented method of claim 12 wherein the binary function is one of All-Element-Sum, Round-Sum, MLP-Concate, MLP-Em-Sum, DeepFM, or a neural network-based measure.

15. The computer-implemented method of claim 12 further comprising randomly selecting, from the base vertices, a base vertex on the bipartite graph as a starting point.

16. The computer-implemented method of claim 15 further comprising using the base vertex to initialize the priority queue with a paired entry.

17. The computer-implemented method of claim 12 wherein the priority queue has a queue size that corresponds to a number of the set of top base elements.

18. The computer-implemented method of claim 12 wherein the bipartite graph was generated using steps comprising:
given at least a base element set, a query element set, and a binary function that defines a relevance measure:
initializing the bipartite graph;
until a stop condition has been reached, iterating steps comprising:
inserting a base element that has been selected from the base element set as a vertex into the bipartite graph;
using a base element search to search vertices, which correspond to elements, in the bipartite graph to identify one or more top query element candidates that are ranked according to the relevance measure;
responsive to a number of outgoing edges for the base element not being exceeded, using a two-hop edge selection process to add directed edges from the base element to each query element from the top query element candidates that cannot be reached in two hops from a selected query element;
inserting a query element that has been selected from the query element set into the bipartite graph;
using a query element search to identify one or more top base element candidates in the bipartite graph that are ranked according to the relevance measure; and responsive to a number of outgoing edges for the query element not being exceeded, using the two-hop edge selection process to add directed edges from the query element to each base element from the top base element candidates that cannot be reached in two hops from a selected base element; and outputting the bipartite graph.

* * * * *